(12) United States Patent
Haraguchi

(10) Patent No.: US 12,704,833 B2
(45) Date of Patent: Aug. 11, 2026

(54) COMPUTER AND SYSTEM INTERCOMMUNICATIVELY CONNECTED TO MACHINE

(71) Applicant: FANUC CORPORATION, Yamanashi (JP)

(72) Inventor: Takahiro Haraguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 327 days.

(21) Appl. No.: 18/569,215

(22) PCT Filed: Jul. 5, 2021

(86) PCT No.: PCT/JP2021/025349
§ 371 (c)(1),
(2) Date: Dec. 12, 2023

(87) PCT Pub. No.: WO2023/281600
PCT Pub. Date: Jan. 12, 2023

(65) Prior Publication Data

US 2024/0280972 A1 Aug. 22, 2024

(51) Int. Cl.
*G05B 19/418* (2006.01)

(52) U.S. Cl.
CPC ..... *G05B 19/4183* (2013.01); *G05B 19/4185* (2013.01)

(58) Field of Classification Search
None
See application file for complete search history.

(56) References Cited

U.S. PATENT DOCUMENTS 7,174,474 B1 * 2/2007 Low .................... H04J 3/0664 713/400
7,865,442 B1 * 1/2011 Sowell .................. G06Q 30/04 705/52
11,689,540 B2 * 6/2023 Hansen .............. H04L 63/0209 726/26
2009/0276771 A1 * 11/2009 Nickolov ........... H04L 67/1029 718/1
2012/0041844 A1 * 2/2012 Shen .................... G06Q 30/06 705/26.61

(Continued)

FOREIGN PATENT DOCUMENTS

JP H10-177579 A 6/1998
JP 2006-053915 A 2/2006

(Continued)

*Primary Examiner* — Hua Lu
(74) *Attorney, Agent, or Firm* — HAUPTMAN HAM, LLP

(57) ABSTRACT

Data of devices adhering to various communication standards are easily unified and managed. Base software of a computer comprises: a first communication unit for receiving first machine information output from a machine and unique to the machine, and first meta information indicating the meaning of the first machine information; a second communication unit for transmitting second machine information unique to work software and second meta information indicating the meaning of the second machine information; a meta information conversion unit for converting the first meta information into the second meta information; and a machine information conversion unit for converting the first machine information into the second machine information.

8 Claims, 18 Drawing Sheets

(56) References Cited

U.S. PATENT DOCUMENTS

| | | | | |
|---|---|---|---|---|
| 2012/0131130 | A1* | 5/2012 | Field | H04L 12/403 709/217 |
| 2013/0103749 | A1* | 4/2013 | Werth | H04L 67/34 709/203 |
| 2013/0212129 | A1* | 8/2013 | Lawson | G06F 1/12 707/779 |
| 2015/0227617 | A1* | 8/2015 | Copass | H04L 67/10 707/756 |
| 2015/0336008 | A1* | 11/2015 | Kohigashi | A63F 13/85 463/25 |
| 2018/0217201 | A1* | 8/2018 | Endo | G01R 31/2831 |
| 2018/0341235 | A1* | 11/2018 | Oda | G05B 15/02 |
| 2020/0226301 | A1* | 7/2020 | Siu | G06F 30/00 |
| 2024/0078441 | A1* | 3/2024 | Duan | G06N 5/02 |
| 2025/0212461 | A1* | 6/2025 | Sawai | H10B 12/00 |

FOREIGN PATENT DOCUMENTS

| | | | |
|---|---|---|---|
| JP | 2008-259096 | A | 10/2008 |
| JP | 2018005833 | A | 1/2018 |
| JP | 2018-180599 | A | 11/2018 |
| JP | 2020-095724 | A | 6/2020 |
| JP | 6767308 | B2 | 10/2020 |
| KR | 1020200045058 | A | 5/2020 |

* cited by examiner

Figure 2:
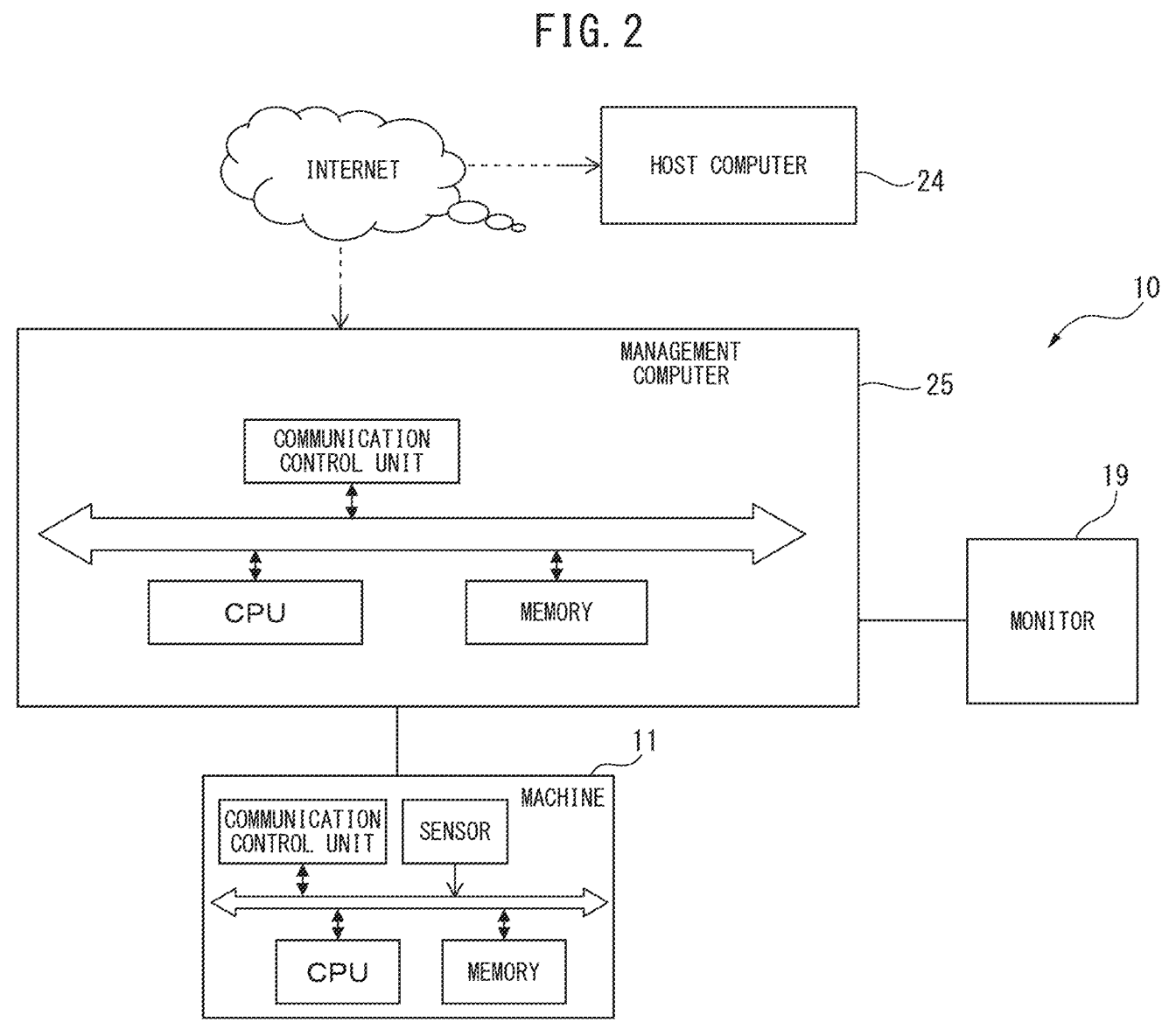

MONITOR

24

HOST COMPUTER

INTERNET

25

MANAGEMENT COMPUTER

COMMUNICATION CONTROL UNIT

MEMORY

CPU

11

MACHINE

SENSOR

COMMUNICATION CONTROL UNIT

MEMORY

CPU

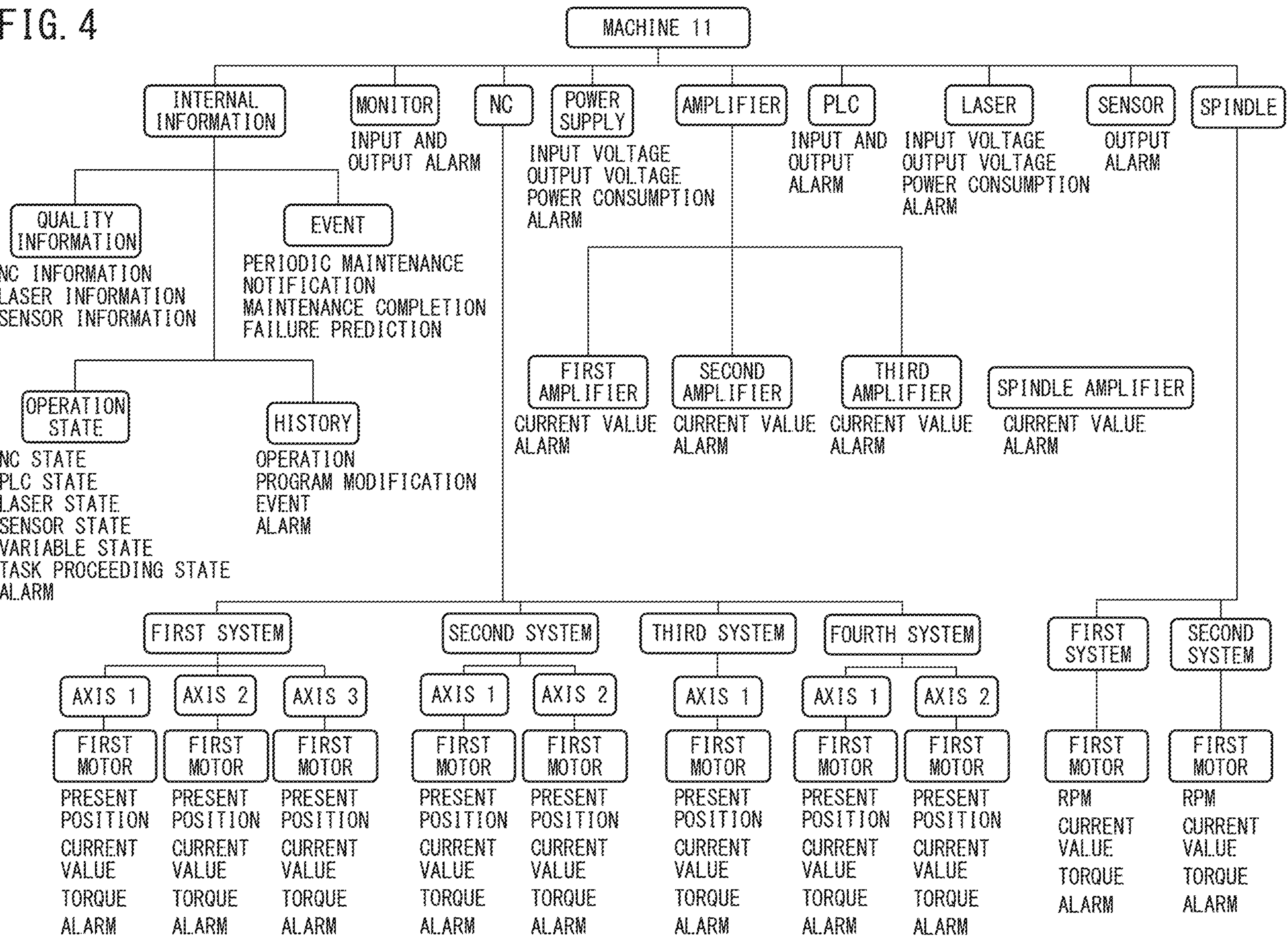
FIG. 4
MACHINE 11
INTERNAL INFORMATION
MONITOR
INPUT AND OUTPUT ALARM
NC
POWER SUPPLY
INPUT VOLTAGE
OUTPUT VOLTAGE
POWER CONSUMPTION
ALARM
AMPLIFIER
PLC
INPUT AND OUTPUT
ALARM
LASER
INPUT VOLTAGE
OUTPUT VOLTAGE
POWER CONSUMPTION
ALARM
SENSOR
OUTPUT
ALARM
SPINDLE
QUALITY INFORMATION
NC INFORMATION
LASER INFORMATION
SENSOR INFORMATION
EVENT
PERIODIC MAINTENANCE NOTIFICATION
MAINTENANCE COMPLETION
FAILURE PREDICTION
OPERATION STATE
NC STATE
PLC STATE
LASER STATE
SENSOR STATE
VARIABLE STATE
TASK PROCEEDING STATE
ALARM
HISTORY
OPERATION
PROGRAM MODIFICATION
EVENT
ALARM
FIRST AMPLIFIER
CURRENT VALUE
ALARM
SECOND AMPLIFIER
CURRENT VALUE
ALARM
THIRD AMPLIFIER
CURRENT VALUE
ALARM
SPINDLE AMPLIFIER
CURRENT VALUE
ALARM
FIRST SYSTEM
AXIS 1
AXIS 2
AXIS 3
SECOND SYSTEM
AXIS 1
AXIS 2
THIRD SYSTEM
AXIS 1
FOURTH SYSTEM
AXIS 1
AXIS 2
FIRST MOTOR
PRESENT POSITION
CURRENT VALUE
TORQUE
ALARM
FIRST SYSTEM
SECOND SYSTEM
FIRST MOTOR
RPM
CURRENT VALUE
TORQUE
ALARM

FIG. 8

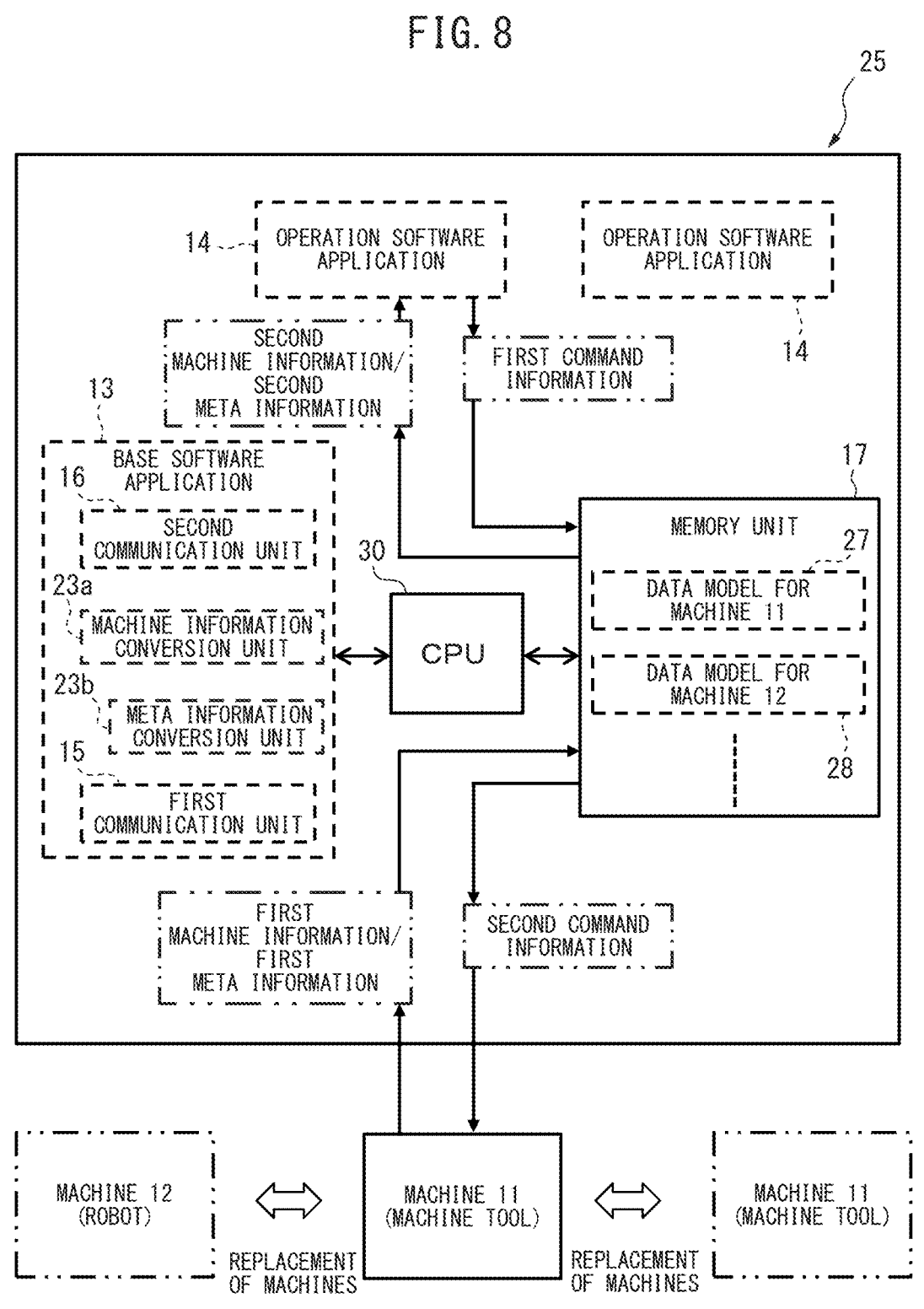

25
14 OPERATION SOFTWARE APPLICATION
OPERATION SOFTWARE APPLICATION 14
SECOND MACHINE INFORMATION/ SECOND META INFORMATION
FIRST COMMAND INFORMATION
13 BASE SOFTWARE APPLICATION
16 SECOND COMMUNICATION UNIT
23a MACHINE INFORMATION CONVERSION UNIT
23b META INFORMATION CONVERSION UNIT
15 FIRST COMMUNICATION UNIT
30 CPU
17 MEMORY UNIT
27 DATA MODEL FOR MACHINE 11
DATA MODEL FOR MACHINE 12 28
FIRST MACHINE INFORMATION/ FIRST META INFORMATION
SECOND COMMAND INFORMATION
MACHINE 12 (ROBOT)
REPLACEMENT OF MACHINES
MACHINE 11 (MACHINE TOOL)
REPLACEMENT OF MACHINES
MACHINE 11 (MACHINE TOOL)

FIG. 9

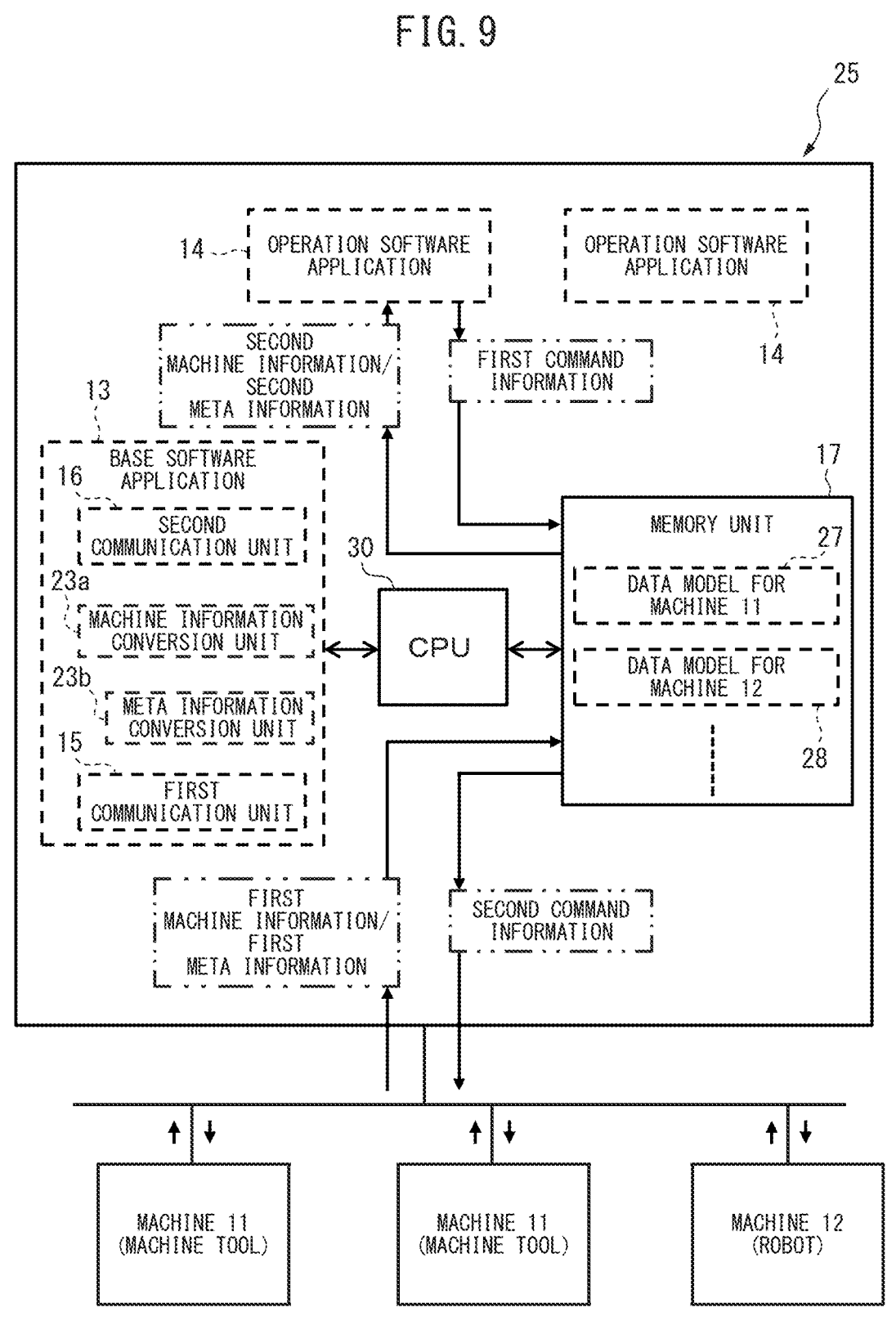

25
OPERATION SOFTWARE APPLICATION
14
OPERATION SOFTWARE APPLICATION
14
SECOND MACHINE INFORMATION/ SECOND META INFORMATION
FIRST COMMAND INFORMATION
13
BASE SOFTWARE APPLICATION
16
SECOND COMMUNICATION UNIT
23a
MACHINE INFORMATION CONVERSION UNIT
23b
META INFORMATION CONVERSION UNIT
15
FIRST COMMUNICATION UNIT
30
CPU
17
MEMORY UNIT
27
DATA MODEL FOR MACHINE 11
DATA MODEL FOR MACHINE 12
28
FIRST MACHINE INFORMATION/ FIRST META INFORMATION
SECOND COMMAND INFORMATION
MACHINE 11 (MACHINE TOOL)
MACHINE 11 (MACHINE TOOL)
MACHINE 12 (ROBOT)

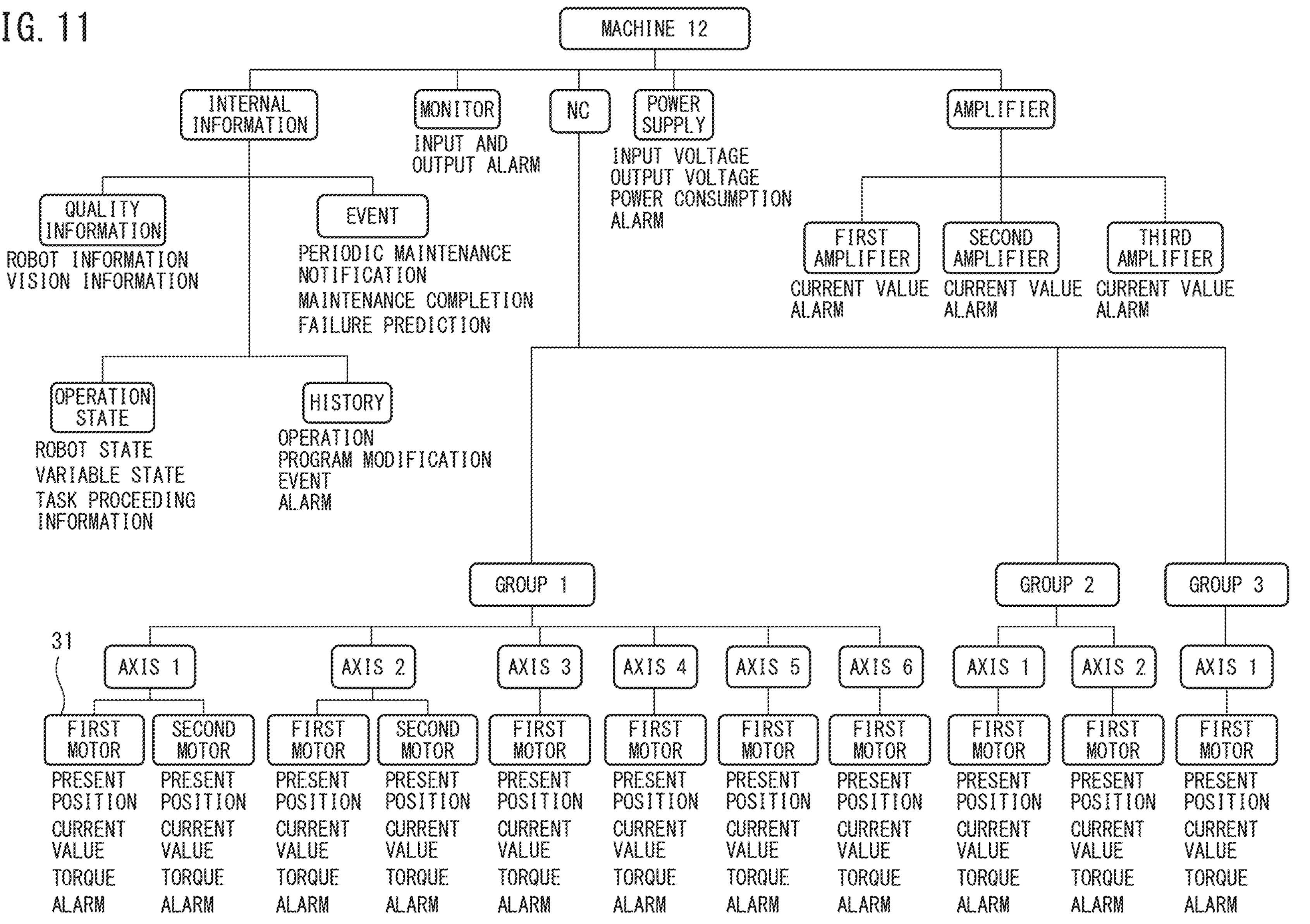
FIG. 11
MACHINE 12
INTERNAL INFORMATION
MONITOR
INPUT AND OUTPUT ALARM
NC
POWER SUPPLY
INPUT VOLTAGE
OUTPUT VOLTAGE
POWER CONSUMPTION
ALARM
AMPLIFIER
QUALITY INFORMATION
ROBOT INFORMATION
VISION INFORMATION
EVENT
PERIODIC MAINTENANCE NOTIFICATION
MAINTENANCE COMPLETION
FAILURE PREDICTION
FIRST AMPLIFIER
CURRENT VALUE
ALARM
SECOND AMPLIFIER
CURRENT VALUE
ALARM
THIRD AMPLIFIER
CURRENT VALUE
ALARM
OPERATION STATE
ROBOT STATE
VARIABLE STATE
TASK PROCEEDING INFORMATION
HISTORY
OPERATION
PROGRAM MODIFICATION
EVENT
ALARM
GROUP 1
GROUP 2
GROUP 3
31
AXIS 1
AXIS 2
AXIS 3
AXIS 4
AXIS 5
AXIS 6
AXIS 1
AXIS 2
AXIS 1
FIRST MOTOR
SECOND MOTOR
PRESENT POSITION
CURRENT VALUE
TORQUE
ALARM S30
STORE CURRENT VALUE OF FIRST MOTOR, FIRST AXIS, FIRST ROBOT GROUP OF MACHINE
S31
DOES NODE CORRESPOND TO FIRST ROBOT GROUP ?
Yes
No
S32
UPDATE ROBOT GROUP NUMBER
S33
DOES NODE CORRESPOND TO FIRST AXIS ?
Yes
No
S34
UPDATE AXIS NUMBER
S35
DOES NODE CORRESPOND TO FIRST MOTOR ?
Yes
No
S36
UPDATE MOTOR NUMBER
S37
STORE CURRENT VALUE
END

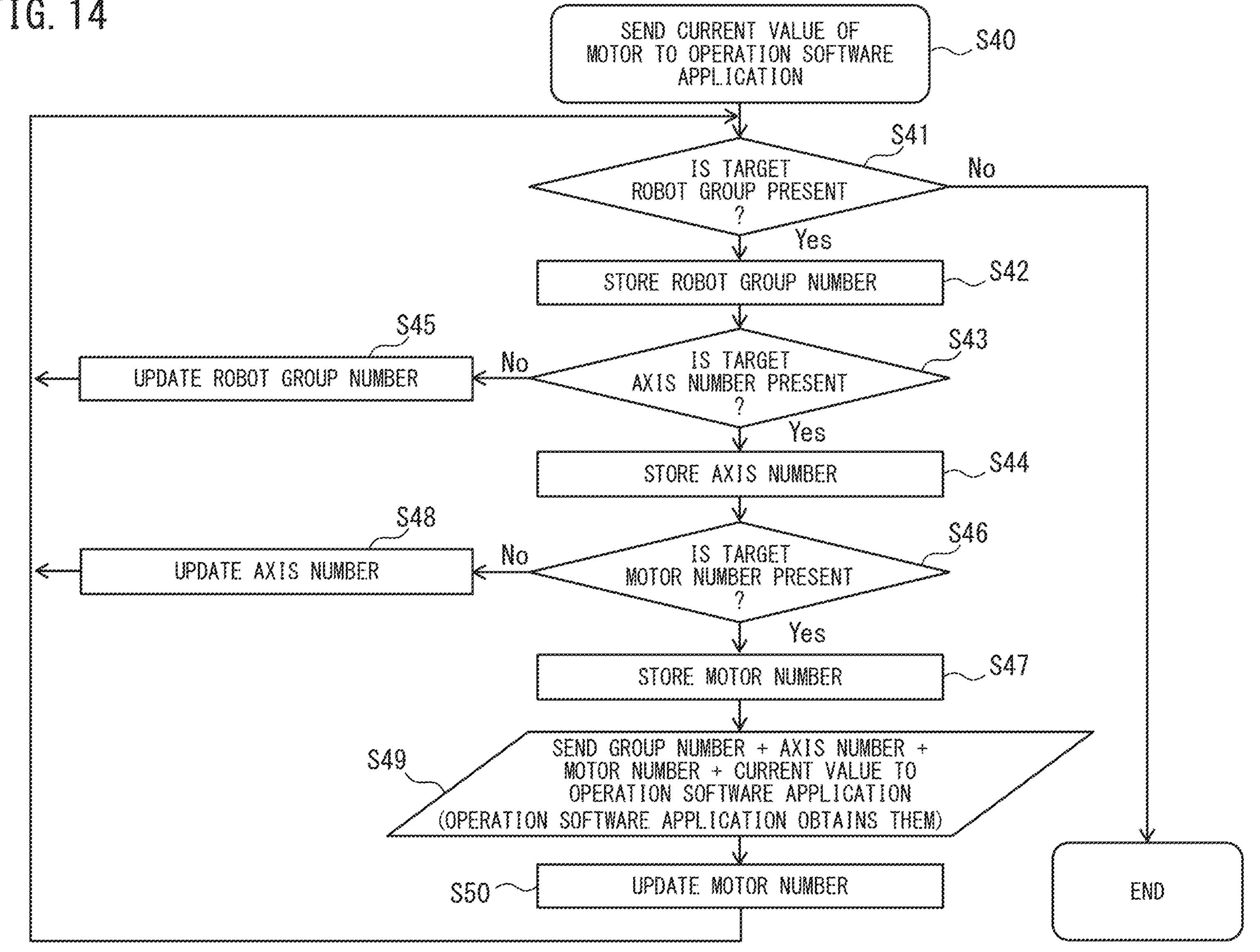
FIG. 14
SEND CURRENT VALUE OF MOTOR TO OPERATION SOFTWARE APPLICATION
S40
IS TARGET ROBOT GROUP PRESENT ?
S41
No
Yes
STORE ROBOT GROUP NUMBER
S42
S45
UPDATE ROBOT GROUP NUMBER
No
IS TARGET AXIS NUMBER PRESENT ?
S43
Yes
STORE AXIS NUMBER
S44
S48
UPDATE AXIS NUMBER
No
IS TARGET MOTOR NUMBER PRESENT ?
S46
Yes
STORE MOTOR NUMBER
S47
S49
SEND GROUP NUMBER + AXIS NUMBER + MOTOR NUMBER + CURRENT VALUE TO OPERATION SOFTWARE APPLICATION
(OPERATION SOFTWARE APPLICATION OBTAINS THEM)
S50
UPDATE MOTOR NUMBER
END

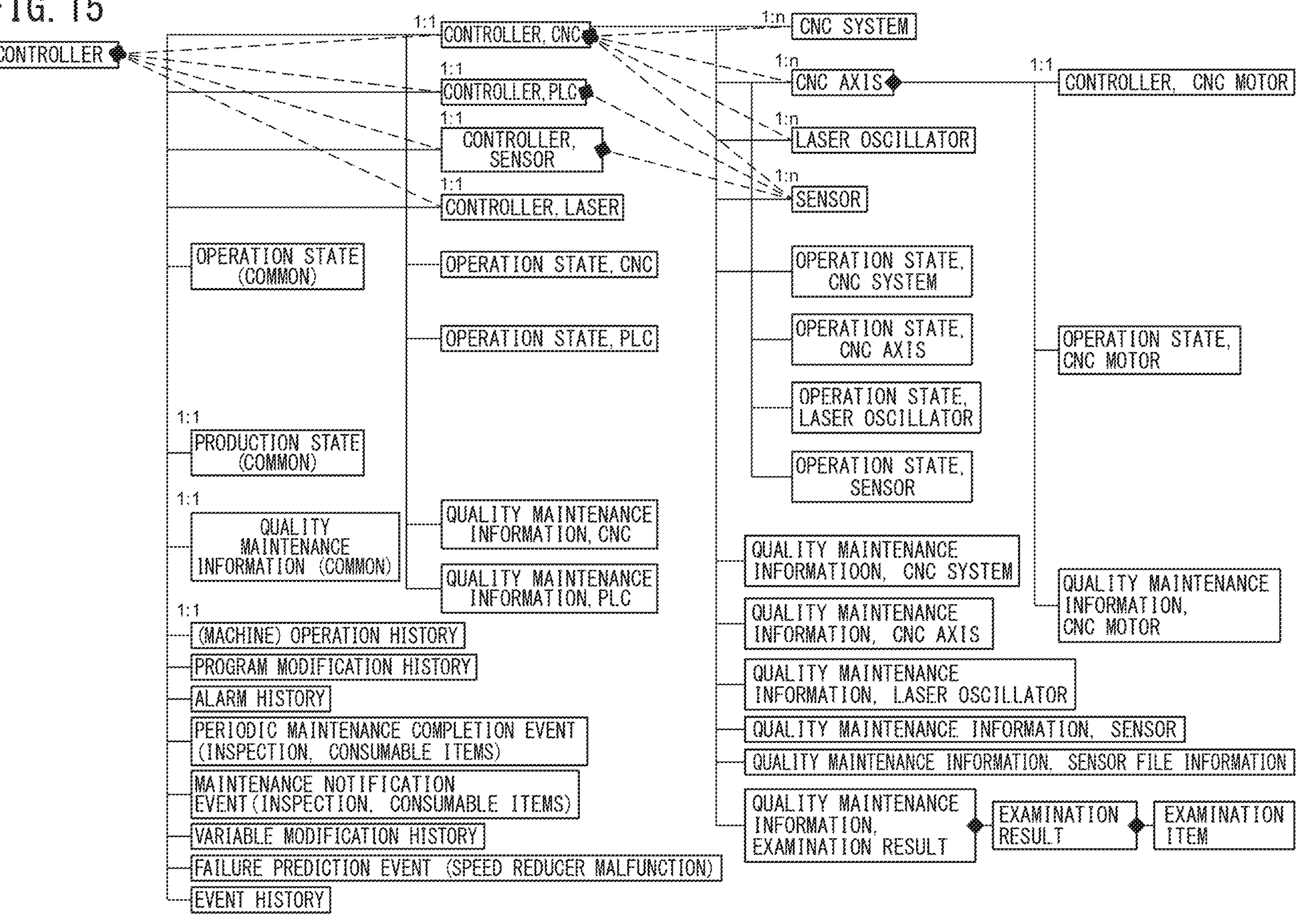
FIG. 15
CONTROLLER
1:1
CONTROLLER, CNC
CONTROLLER, PLC
CONTROLLER, SENSOR
CONTROLLER, LASER
OPERATION STATE (COMMON)
OPERATION STATE, CNC
OPERATION STATE, PLC
PRODUCTION STATE (COMMON)
QUALITY MAINTENANCE INFORMATION (COMMON)
QUALITY MAINTENANCE INFORMATION, CNC
QUALITY MAINTENANCE INFORMATION, PLC
(MACHINE) OPERATION HISTORY
PROGRAM MODIFICATION HISTORY
ALARM HISTORY
PERIODIC MAINTENANCE COMPLETION EVENT (INSPECTION, CONSUMABLE ITEMS)
MAINTENANCE NOTIFICATION EVENT (INSPECTION, CONSUMABLE ITEMS)
VARIABLE MODIFICATION HISTORY
FAILURE PREDICTION EVENT (SPEED REDUCER MALFUNCTION)
EVENT HISTORY
1:n
CNC SYSTEM
CNC AXIS
LASER OSCILLATOR
SENSOR
CONTROLLER, CNC MOTOR
OPERATION STATE, CNC SYSTEM
OPERATION STATE, CNC AXIS
OPERATION STATE, LASER OSCILLATOR
OPERATION STATE, SENSOR
OPERATION STATE, CNC MOTOR
QUALITY MAINTENANCE INFORMATIOON, CNC SYSTEM
QUALITY MAINTENANCE INFORMATION, CNC AXIS
QUALITY MAINTENANCE INFORMATION, LASER OSCILLATOR
QUALITY MAINTENANCE INFORMATION, SENSOR
QUALITY MAINTENANCE INFORMATION, SENSOR FILE INFORMATION
QUALITY MAINTENANCE INFORMATION, EXAMINATION RESULT
EXAMINATION RESULT
EXAMINATION ITEM
QUALITY MAINTENANCE INFORMATION, CNC MOTOR

FIG. 16

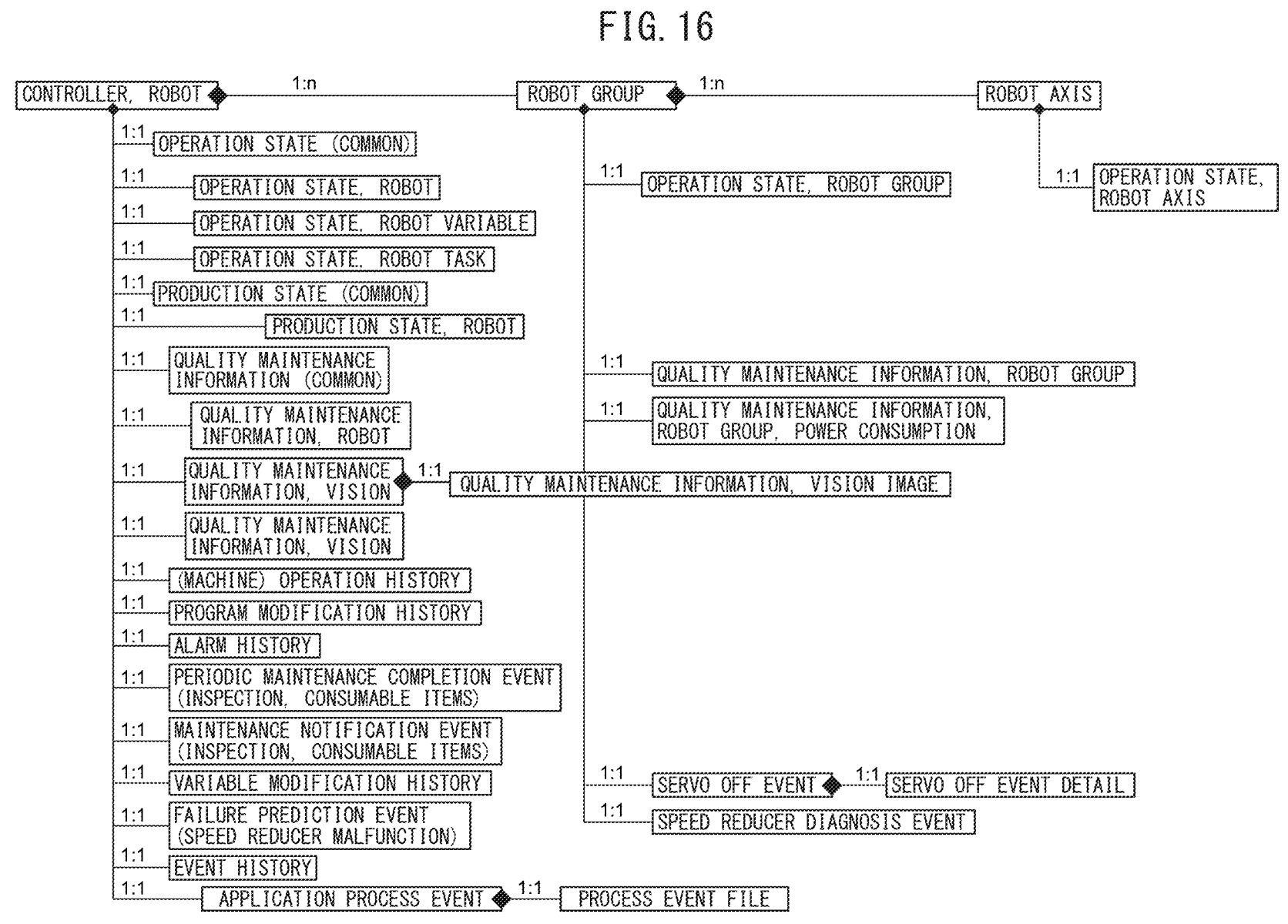

CONTROLLER, ROBOT
1:n
ROBOT GROUP
1:n
ROBOT AXIS
1:1
OPERATION STATE, ROBOT AXIS
1:1
OPERATION STATE, ROBOT GROUP
1:1
QUALITY MAINTENANCE INFORMATION, ROBOT GROUP
1:1
QUALITY MAINTENANCE INFORMATION, ROBOT GROUP, POWER CONSUMPTION
QUALITY MAINTENANCE INFORMATION, VISION IMAGE
1:1
SERVO OFF EVENT
1:1
SERVO OFF EVENT DETAIL
1:1
SPEED REDUCER DIAGNOSIS EVENT
1:1
OPERATION STATE (COMMON)
1:1
OPERATION STATE, ROBOT
1:1
OPERATION STATE, ROBOT VARIABLE
1:1
OPERATION STATE, ROBOT TASK
1:1
PRODUCTION STATE (COMMON)
1:1
PRODUCTION STATE, ROBOT
1:1
QUALITY MAINTENANCE INFORMATION (COMMON)
1:1
QUALITY MAINTENANCE INFORMATION, ROBOT
1:1
QUALITY MAINTENANCE INFORMATION, VISION
1:1
QUALITY MAINTENANCE INFORMATION, VISION
1:1
(MACHINE) OPERATION HISTORY
1:1
PROGRAM MODIFICATION HISTORY
1:1
ALARM HISTORY
1:1
PERIODIC MAINTENANCE COMPLETION EVENT (INSPECTION, CONSUMABLE ITEMS)
1:1
MAINTENANCE NOTIFICATION EVENT (INSPECTION, CONSUMABLE ITEMS)
1:1
VARIABLE MODIFICATION HISTORY
1:1
FAILURE PREDICTION EVENT (SPEED REDUCER MALFUNCTION)
1:1
EVENT HISTORY
1:1
APPLICATION PROCESS EVENT
1:1
PROCESS EVENT FILE

COMPUTER AND SYSTEM INTERCOMMUNICATIVELY CONNECTED TO MACHINE

RELATED APPLICATIONS

The present application is a National Phase of International Application No. PCT/JP2021/025349 filed Jul. 5, 2021.

TECHNICAL FIELD

The present invention relates to a computer intercommunicatively connected to a machine, and system.

BACKGROUND ART

In recent years, there have been realized cell production systems in which at least one machine is integrated as one manufacturing cell and manufacturing is carried out in units of manufacturing cells for each process. A cell control device receives production planning instructions from a production planning device via internet communication and controls a plurality of machines at a manufacturing site via intranet communication.

In the above cell control systems, a specific operation software application is installed into the cell control system to establish intercommunication between each of the machines and the cell control system, and to operate each of the machines.

In this case, information is required to be transmitted and received among a base software application and the operation software application of the cell control system and each of the machines. At this time, it is also required to manage the operation software application installed in the cell control system.

Patent Literature 1 (Japanese Patent No. 6767308) discloses a machine system which is capable of exchanging information between base software application, operation software application, and each machine, and managing the exchange of the information.

CITATION LIST

Patent Literature

[PTL 1]
Japanese Patent No. 6767308

SUMMARY OF INVENTION

Technical Problem

However, various machines are used at manufacturing sites, and the communication standards of these machines are not necessarily unified. Thus, it is necessary to prepare a separate communication interface corresponding to each communication standard, collect data, and set a useful data model for exchanging information. In this case, it is necessary to select an appropriate data model from a plurality of existing data models or define a new data model.

However, when selecting an appropriate data model from a plurality of existing data models, there is a risk that an appropriate data model does not exist for the collected data. In such cases, some of the collected data is effectively unusable.

Further, when defining a new data model, knowledge of the data model is required, and additional man-hours are required to set up the new data model.

Thus, it is desirable to simplify the settings for storing collected data as a data model and provide a computer and system which can easily centrally manage data from devices having various communication standards.

Solution to Problem

According to a first aspect of the present disclosure, there is provided a computer communicably connected to at least one machine, comprising a base software application and an operation software application installed in the computer, wherein the base software application includes a first communication unit being a program portion to enable an arithmetic device of the computer to receive first machine information, which is specific to the machine, output from the machine, and first meta information representing a meaning of the first machine information, a second communication unit being a program portion to enable the arithmetic device of the computer to transmit second machine information, which is specific to the operation software application, and second meta information representing a meaning of the second machine information to the operation software application, a meta information conversion unit being a program portion to enable the arithmetic device of the computer to convert the first meta information to the second meta information, and a machine information conversion unit being a program portion to enable the arithmetic device of the computer to convert the first machine information to the second machine information, wherein the operation software application is a program using the second machine information as input information.

Advantageous Effects of Invention

In the first aspect, a new data model is automatically defined by the meta information conversion unit automatically converting the first meta information to the second meta information. Thus, neither the operation of selecting an appropriate data model from a plurality of data models nor the operation of creating a new data model by the operator is required. Specifically, the setting for retaining data is simplified, whereby it becomes possible to easily centrally manage the data of devices conforming to various communication standards.

The objects, features, and advantages of the present invention will be further clarified from the following description of the embodiments in conjunction with the accompanying drawings.

BRIEF DESCRIPTION OF DRAWINGS

FIG. 2 is a view illustrating the hardware configuration of the management computer and machine shown in FIG. 1.

FIG. 4 is a view illustrating an example of a data model for an NC machine tool.

FIG. 8 is a view illustrating a configuration example for the conversion processing of command information to be executed by the CPU of the management computer.

FIG. 9 is a view illustrating a configuration example different from FIG. 8.

FIG. 11 is a view illustrating an example of a robot data model.

FIG. 13A is a view schematically illustrating the operation described with reference to FIG. 12.

FIG. 13B is a view schematically illustrating the operation described with reference to FIG. 12.

FIG. 14 is a flowchart illustrating an example of an information conversion operation when transmitting motor current value information to operation software application.

FIG. 15 is a view illustrating another example of a data model for an NC machine tool.

FIG. 16 is a view illustrating another example of robot data.

DESCRIPTION OF EMBODIMENTS

Figure 1:
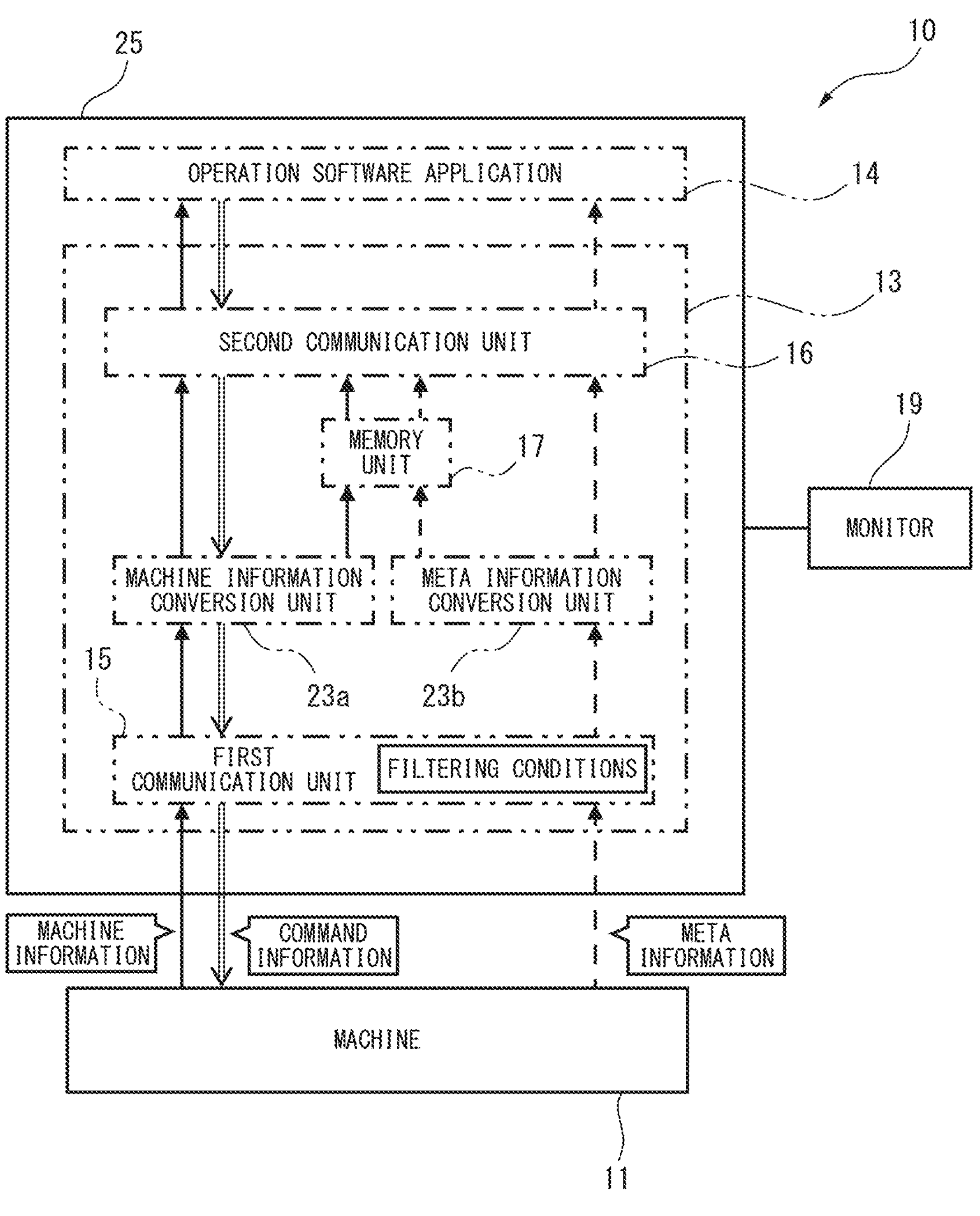
FIG. 1 is a view schematically illustrating the configuration of a machine system according to an embodiment.

The embodiments of the present invention will be described below with reference to the attached drawings. In the drawings, corresponding constituent elements have been assigned common reference signs. In order to facilitate understanding, the scales of the drawings have been appropriately modified. Furthermore, the forms illustrated in the drawings are merely one example for carrying out the invention. The present invention is not limited to the illustrated forms.

FIG. 1 is a view schematically illustrating the configuration of a machine system according to an embodiment.

Referring to FIG. 1, the machine system 10 of the present embodiment comprises a machine 11 and a personal computer for managing the machine (hereinafter abbreviated as management computer) 25 communicably connected to the machine 11. A base software application 13 and an operation software application 14 are installed in the management computer 25. Although a single machine 11 is illustrated in FIG. 1, a plurality of machines 11 and 12 may be connected, as described later. The machines 11 and 12 in the description of the present disclosure are assumed to include devices configured to have a plurality of devices connected under them and to manage the devices under their control in an integrated manner.

The base software application 13 includes a first communication unit 15, which is a program portion to enable the CPU (not shown) of the management computer 25 to receive first machine information and first meta information output from the machines 11 (and 12). Although the term CPU is used in this disclosure, another arithmetic device such as a GPU may be used instead of the CPU.

The base software application 13 includes a second communication unit 16 which is a program portion to enable the CPU of the management computer 25 to transmit second machine information and second meta information to the operation software application 14. The base software application 13 also includes a storage processing unit (not shown) which is a program portion to enable the CPU of the management computer 25 to store the first machine information, the second machine information, the first meta information, and the second meta information in a memory unit 17 of the management computer 25. Although the memory unit 17 is provided inside the management computer 25 in the present embodiment, the memory unit 17 may be outside the management computer 25.

The first communication unit 15 may contain a program portion to enable the CPU of the management computer 25 to transmit second command information to the machine. The second communication unit 16 may contain a program portion to enable the CPU of the management computer to receive first command information from the operation software application 14. The memory unit 17 may further store the first command information and the second command information.

The above-mentioned first machine information is information indicating the state of machines 11 (and 12). The second machine information is information specific to the operation software application. The first command information described above is information specific to the operation software application, and the second command information is information specific to the machines 11 (and 12) indicating the contents of the command to be given to the machines 11 (and 12). The first meta information and the second meta information are information indicating the meanings of the first machine information and the second machine information, respectively. For example, the first meta information and the second meta information are incidental information attached to the first machine information and the second machine information, respectively, and can be information describing the contents of the first machine information and the second machine information. Specific examples of this information will be described later.

Each of the machines 11 (and 12) has the function of outputting the state of the machine 11 (and 12) to the management computer 25 as the first machine information, and the function of determining an operation to be performed by the machine 11 (or 12) based on the second command information. In other words, upon receiving the second command information, each of the machines 11 (and 12) performs the operation corresponding to the contents of the second command information. The machines 11 and 12 are machines in different categories from each other. For example, the machine 11 is a NC machine tool, and the machine 12 is an industrial robot. Further splintering the category of NC machine tools, the machine 11 may be a milling machine, and the machine 12 may be a lathe. Further splintering the category of industrial robots, the machine 11 may be a horizontal articulated robot, and the machine 12 may be a vertical articulated robot.

A machine of a different category from NC machine tools, industrial robots, or the like, for example, a peripheral device such as a PLC or a laser device may be connected to the management computer 25. Furthermore, one or more machines 11, one or more machines 12, and one or more machines of another type may be connected to the management computer 25.

Furthermore, the operation software application 14 is a program that enables the CPU of the management computer 25 to generate the first command information for each of the machines 11 (and 12) based on the second machine information inputted from the second communication unit 16, and output the first command information.

More specifically, in this embodiment, the first communication unit 15 is preferably a program portion that enables the CPU of the management computer 25 to receive the first machine information outputted from each of the machines 11 (and 12) in association with identification information of each of the machines 11 (and 12), and to transmit the second command information to each of the machines 11 (and 12). The second communication unit 16 is preferably a program portion that enables the CPU of the management computer 25 to receive the first command information from the operation software application 14 in association with the identification information of each of the machines 11 (and 12), and to transmit the second machine information to the operation software application 14 in association with the identification information of each of the machines 11 (and 12). The identification information of each of the machines 11 (and 12) is, for example, an identification number assigned to each of the machines 11 (and 12).

The memory of the management computer 25 preferably stores the first machine information, the second machine information, the first command information, and the second command information in association with the identification information of each of the machines 11 (and 12).

Each of the machines 11 (and 12) can output the state of the machine 11 or 12 to the management computer 25 as the first machine information in association with the identification information of each of the machines 11 (and 12), and determine an operation to be performed by the machine 11 or 12 based on the second command information.

The operation software application 14 may be a program that enables the CPU of the management computer 25 to generate the first command information for each of the machines 11 (and 12) based on the second machine information inputted from the second communication unit 16 in association with the identification information of each of the machines 11 (and 12), and to output the first command information in association with the identification information of each of the machines 11 (and 12).

In the embodiment shown in FIG. 1, the management computer 25 receives the first meta information indicating the meaning of the first machine information indicating the states of the machines outputted from each of the machines 11 (and 12), and converts the first meta information into the second meta information by the base software application 13. The management computer 25 receives the first machine information, converts the first machine information into the second machine information based on the second meta information by the base software application 13, and outputs the second machine information of each of the machines 11 (and 12) to the operation software application 14. After that, the management computer 25 generates the first command information based on the second machine information by the operation software application 14. The management computer 25 converts the first command information into the second command information by the base software application 13, and transmits the second command information to each of the machines 11 (and 12).

In this embodiment, however, the transmissions of the first command information and the second command information, as described above, are not indispensable. The operation software application 14 may be a program that uses the second machine information outputted from the second communication unit 16, e.g. information of an XML (Extensible Markup Language) format, a JSON (JavaScript Object Notation) format, or the like, as input information. For example, the operation software application 14 may be a software application such as an analysis software application or a tabulation display software application. In this case, the first communication unit 15 may enable the CPU of the management computer 25 to receive the first machine information outputted from each of the machines 11 (and 12), e.g. numerical data, text data, or the like. On the other hand, the second communication unit 16 may enable the CPU of the management computer 25 to transmit the second machine information to the operation software application 14.

The first machine information and the second command information to be transmitted and received between the management computer 25 and each of the machines 11 (and 12) are information specific to each of the machines 11 (and 12), for example, numerical data, text data, or the like. On the other hand, in the management computer 25, the second machine information and the first command information to be inputted and outputted between the base software application 13 and the operation software application 14 are information specific to the operation software application 14, for example, information of an XML format, a JSON format, or the like.

Therefore, the base software application 13 of the present embodiment further includes a machine information conversion unit 23*a*, which is a program portion to enable the CPU of the management computer 25 to convert the first machine information into the second machine information. The machine information conversion unit 23*a* may include a program portion for causing the CPU of the management computer 25 to execute converting the first command information to the second command information.

Further, the base software application 13 of the present embodiment further comprises a meta information conversion unit 23*b*, which is a program portion to enable the CPU of the management computer 25 to convert the first meta information to the second meta information.

As shown in FIG. 2, the machines 11 (and 12) and the management computer 25 are configured in a computer system including memories, CPUs (central processing units), communication control units, and the like connected through buses. The memories include ROMs (read only memories), RAMs (random access memories), and the like. The base software application 13 and the operation software application 14 according to this embodiment are appropriately stored in the ROM or RAM of the management computer 25. The memories described above are used for the memory unit 17 for storing the first machine information, the second machine information, the first command information, the second command information, the first meta information, and the second meta information. The first communication unit 15, the second communication unit 16, the machine information conversion unit 23*a*, and the meta information conversion unit 23*b* are program portions (so-called modules) included in the base software application 13 stored in ROM or RAM. To achieve operations or processes based on the program portions, the CPU of the management computer 25 executes each module of the base software application 13 and the operation software application 14.

Figure 3:
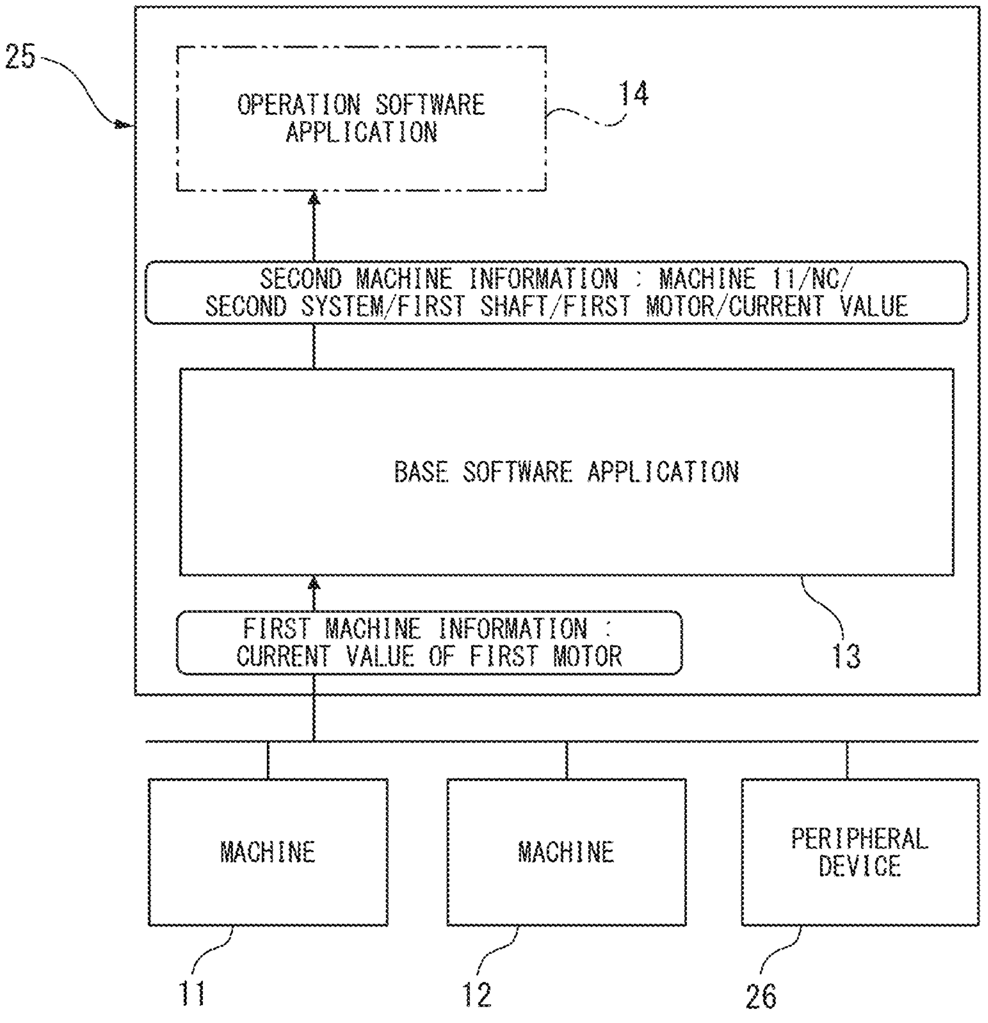
FIG. 3 is a view schematically illustrating an example of an aspect when first machine information is converted to second machine information based on a data model.
Figure 5:
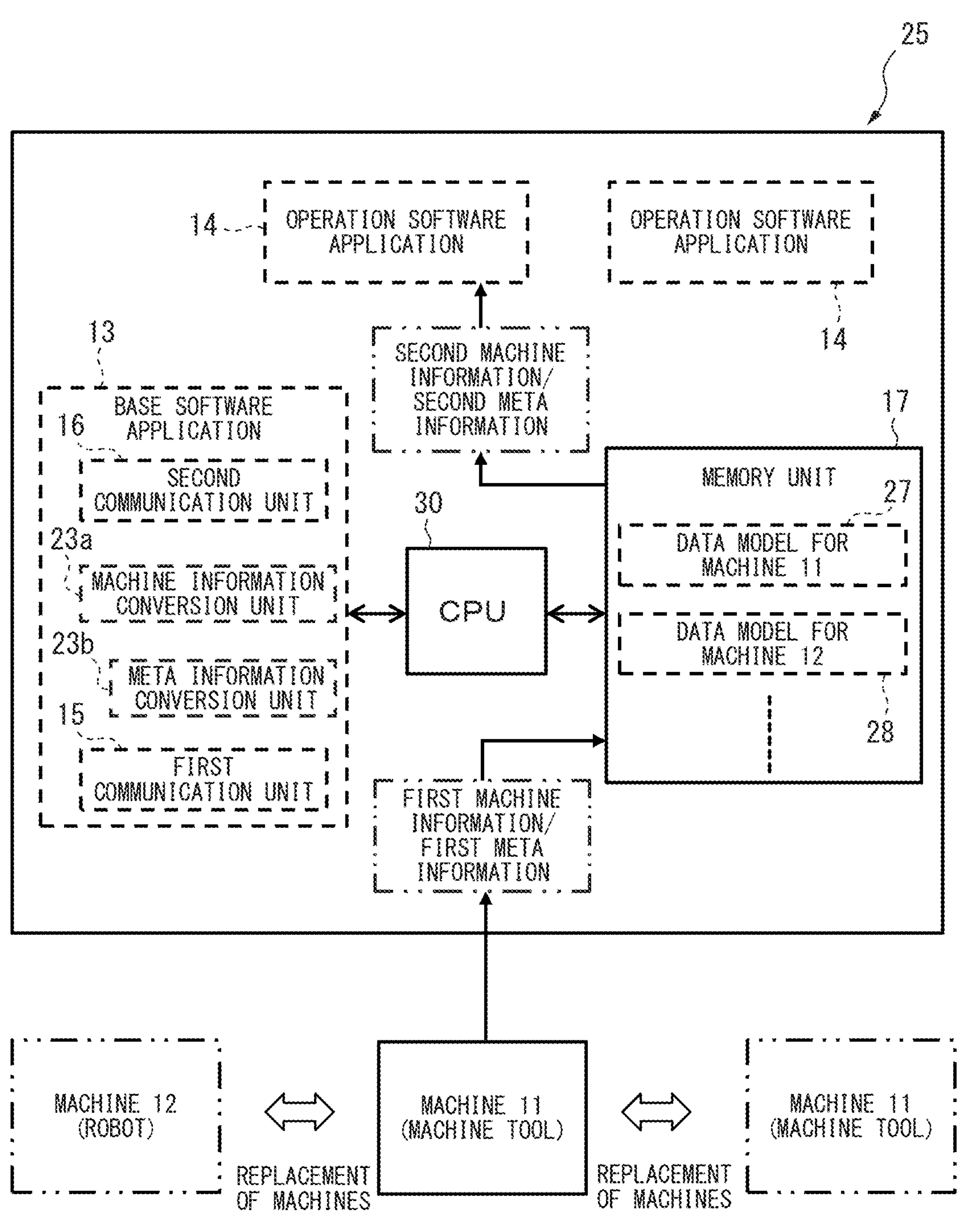
FIG. 5 is a view illustrating a configuration example for the conversion processing of the machine information shown in FIG. 3 to be executed by the CPU of the management computer.
Figure 6:
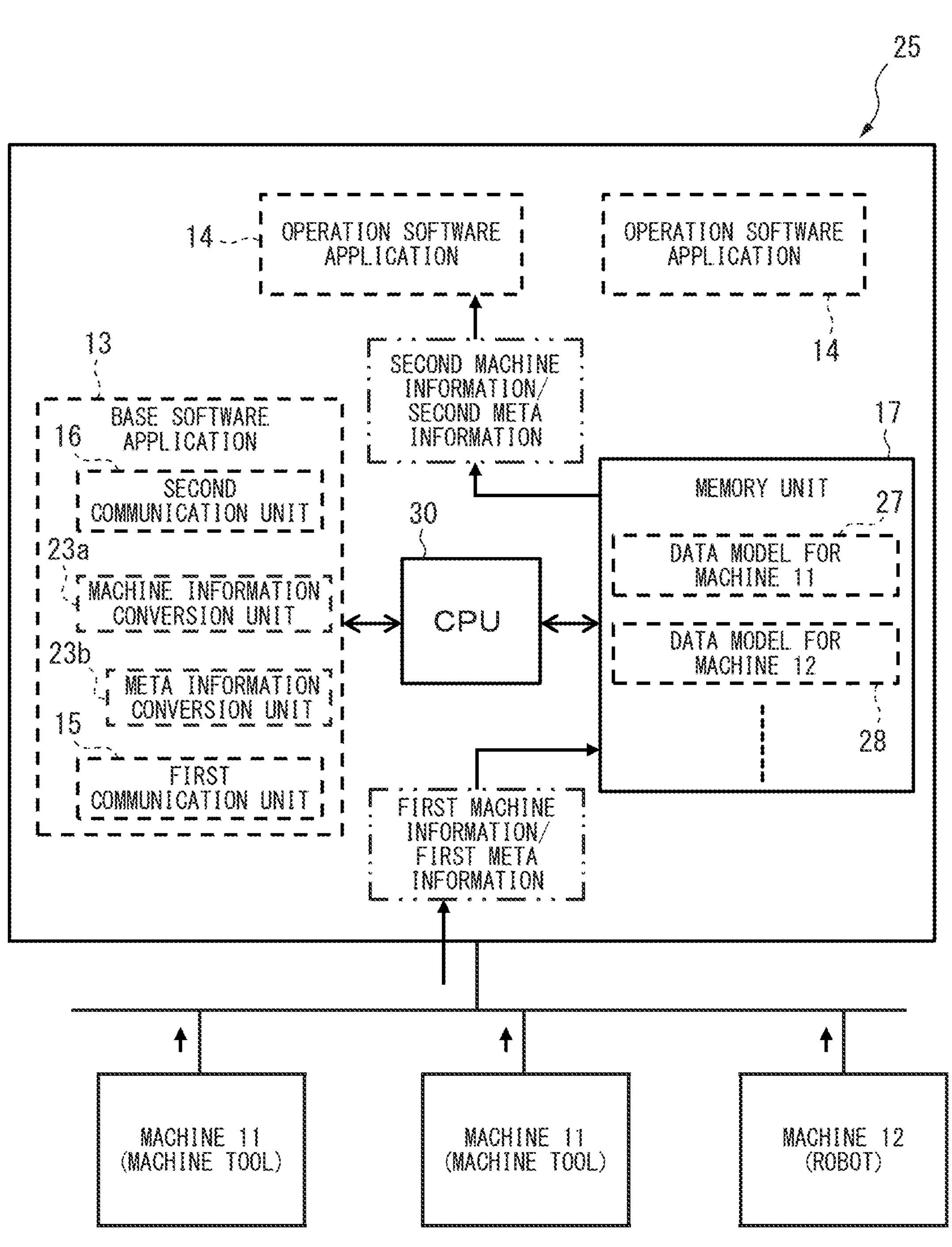
FIG. 6 is a view illustrating a configuration example different from FIG. 5.
Figure 7A:
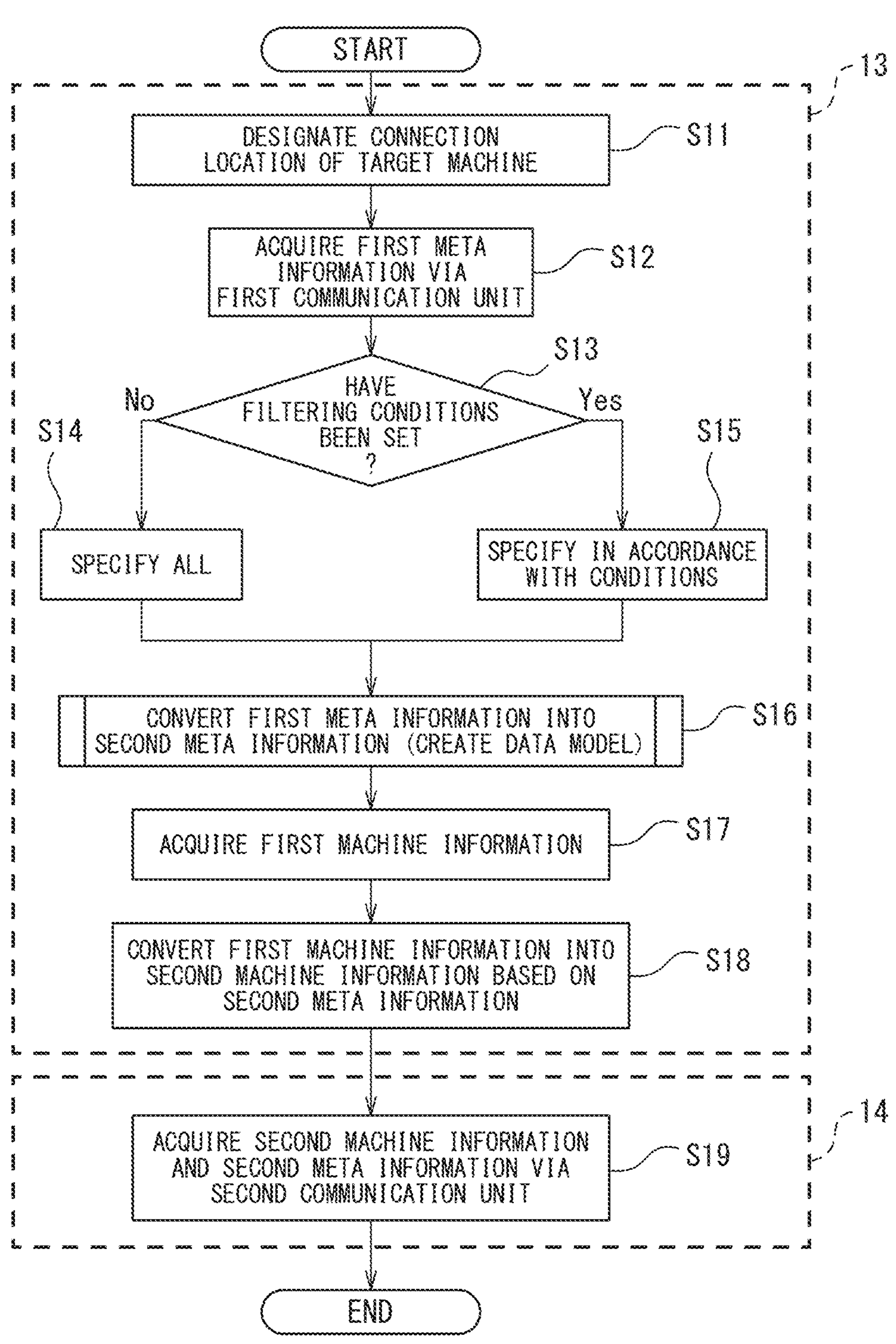
FIG. 7A is a flowchart illustrating the operation of the machine system.

FIG. 5 is a view showing a configuration example for executing the conversion processing of the machine information shown in FIG. 3 by the CPU 30 of the management computer 25, and FIG. 6 is a view showing a configuration example different from FIG. 5. The memory unit 17 is a storage area within the memory of the management computer 25 described above. FIG. 7A is a flowchart showing the operational flow of the machine system including the management computer 25 according to the configuration example shown in FIG. 5 or FIG. 6.

The program shown in FIG. 7A is stored in the memory of the management computer 25. Further, in a typical embodiment, steps S11 to S18 are performed by the base software application 13, and step S19 is performed by the operation software application 14. However, in the embodiments described later, this could not be the case.

First, in step S11, the connection destination of the target machine 11 is designated and connected. The connection destination information specified for the machine 11, which is the acquisition source of the first machine information, includes communication standards, IP addresses, communication protocols, user certification information, and the like. Communication standards for such connection destination information are, for example, OPC UA (OPC Unified Architecture), MTConnect, and the like. If the connection destination information is specified in advance and stored in the memory or the like of the management computer 25, the stored connection destination information may be used. In one example, the connection destination (end point) related to the OPC UA server as the machine 11 is specified as the connection destination information, whereby the base software application 13 connects to the OPC UA server via the first communication unit 15.

Figure 7B:
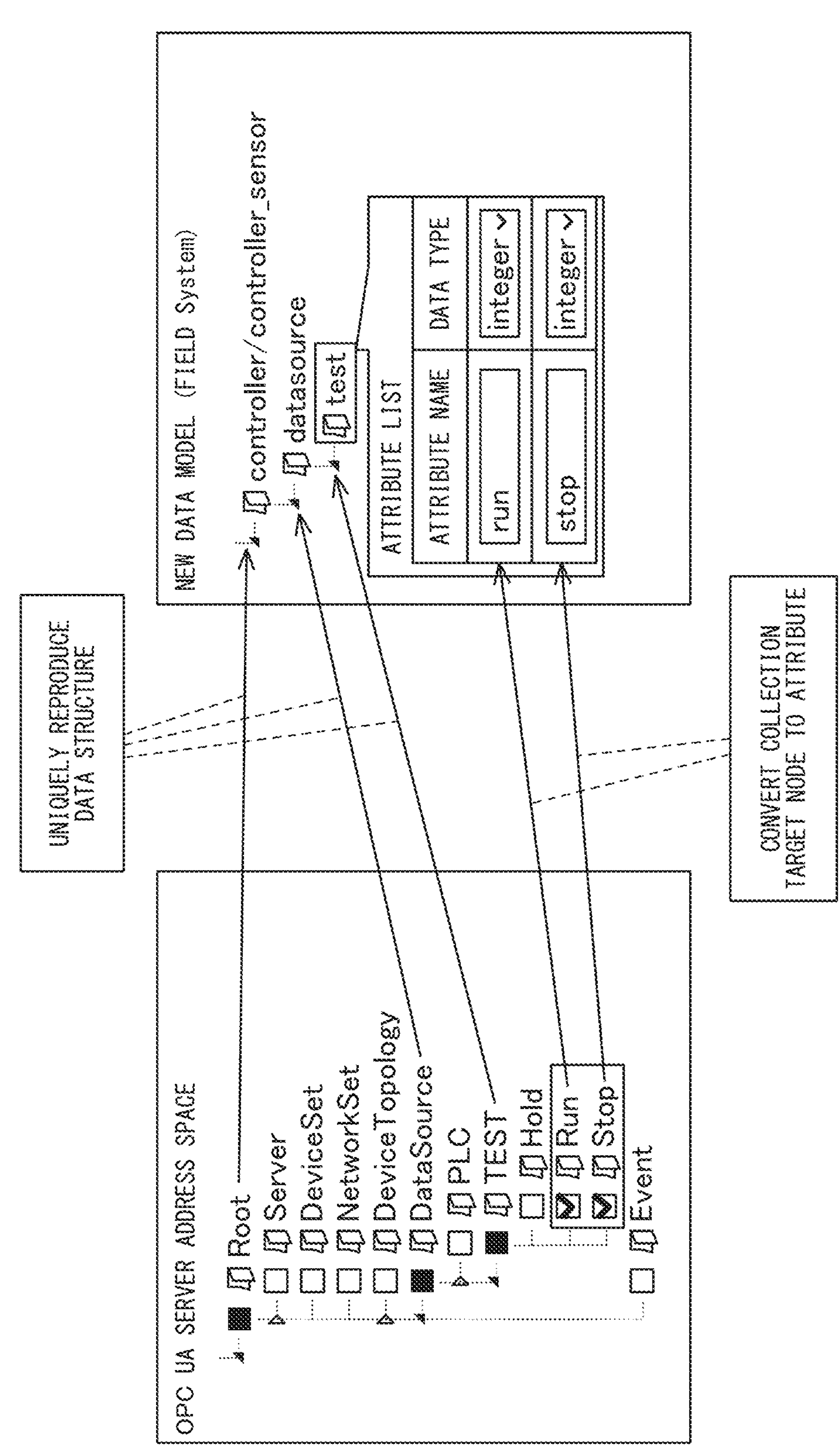
FIG. 7B is a view illustrating an original data model and a new data model in one example.

FIG. 7B is a view showing the original data model and the new data model in one example. In this case, the original data model corresponds to "first meta information or part thereof", and the new data model corresponds to "second meta information or part thereof". In FIG. 7B, as an example, part of the address space within the server when the communication standard is OPC UA is shown on the left. In this example, a tree-structured data model is shown, and the "Server", "DeviceSet", "NetworkSet", "DeviceTopology", "DataSource", "Event", etc., as child nodes connect to the "Root" node. Note that another data structure, such as a mesh structure, may be used. Of course, other communication standards, such as MTConnect, have different data models.

Next, in step S12, the first meta information is acquired via the first communication unit 15. The first meta information includes information (manufacturer, model, model number, IP address, etc.) of the machine 11 from which the first machine information to be acquired is obtained. The first meta information further includes information necessary when acquiring the first machine information from the machine 11. Such information is, for example, signal address in PLC, node ID in OPC UA, data item ID in MTConnect, etc. When the first machine information has a tree structure, the first meta information includes the relationship between parent nodes and child nodes. The data model shown on the left side of FIG. 7B can be the first meta information.

For example, the first meta information in the "Run" node includes the first machine information acquisition method (OPC UA), display name (Run), node structure (parent node is "TEST", no child node, etc.), data type (Int16), data range (0 to 1), unit information (no unit), and other information that gives meaning to the value. The first meta information in other nodes is generally the same.

Next, in step S13, it is determined whether filtering conditions are specified. Filtering conditions include, for example, data pre-specified as acquisition targets among data that can be acquired from the machine 11.

For example, FIG. 7B shows a "Run" node and a "Stop" node. The parent node of these nodes is the "TEST" node. Furthermore, the parent node of the "TEST" node is the "DataSource" node. In FIG. 7B, the squares at the top of each node of "Root", "DataSource" and "TEST" are colored black. In this manner, a plurality of specific nodes having a predetermined parent-child relationship may be designated as filtering conditions.

The "Run" node in FIG. 7B is a running flag, the "Stop" node is a stop flag, and the data type of these nodes is "Int16". In one example, all nodes whose data type is "Int16" may be specified as filtering conditions. In other words, data types with specific formats may be specified as filtering conditions.

Alternatively, the OPC UA server address space shown in FIG. 7B may be displayed on the monitor 19 shown in FIG. 1. In this case, the operator enters a check mark in the square at the beginning of each node of "Run" and "Stop" to designate each node of "Run" and "Stop" as a data collection target node. Specifying nodes by the operator can be a type of filtering conditions. If there are such filtering conditions, nodes are designated according to the filtering conditions in step S15 of FIG. 7A. If there are no filtering conditions, all nodes can be specified (step S14).

Note that if there are filtering conditions or node designation by the operator, first meta information about nodes other than the node designated according to the conditions is not acquired. Since OPC UA servers generally have a vast address space, it is not realistic to acquire all nodes, and in many cases the required information is only a small part of the OPC UA server node group. As a result, the time and amount of communication required to acquire the first meta information can be reduced.

In the example in FIG. 7B, the first meta information about each node of "Root", "DataSource", "TEST", "Run" and "Stop" is obtained. For each node of "Server", "DeviceSet", "NetworkSet", and "DeviceTopology", no filtering conditions are specified, and thus, the first meta information is not acquired.

In FIG. 7B, the first machine information related to the "Run" node is substantially only the "Run" value (0 or 1). Even if a node group such as an OPC UA server is displayed on the monitor 19, the first machine information itself is not displayed in FIG. 7B.

The first meta information thus acquired is converted to second meta information (including the new data model) by the meta information conversion unit 23*b* in step S16. Conversion from the first meta information to the second meta information is performed as follows, and a new data model is created based on the data model included in the first meta information.

In the above example, the nodes "Root", "DataSource", "TEST", "Run" and "Stop" in the OPC UA server address space are specified. Each node of "Run" and "Stop" with a check mark is a data collection target node.

In such a case, a new data model 27 is created as shown on the right side of FIG. 7B. In the new data model, each node of "Root", "DataSource", and "TEST" specified as filtering conditions is reproduced with the parent-child relationship of these nodes. Each node of "Server", "DeviceSet", "NetworkSet", and "DeviceTopology" not specified is not reproduced in the new data model, and these nodes are eliminated as unnecessary nodes at the time of conversion.

A new data model is thus created uniquely and/or irreversibly based on the data model contained in the first meta information.

In general, from each node in the OPC UA server address space, it is possible to acquire not only the information shown in the drawings but also various incidental information such as explanatory information. Although not shown in the drawing, other information included in the first meta information is assumed to be reflected in the nodes of the new data model.

Between the first meta information and the second meta information, there may be differences in constraints such as the identification name of each node and connections between nodes. In the example shown in FIG. 7B, the new data model has the following constraints. Note that these constraints are not necessarily required, and some of these constraints may not be required.

The top node of the tree structure is the controller.

Only controller_* (*is a character string indicating the device type) can be connected to the controller.

Only numbers, lowercase letters, and underscores can be used for node identification names.

The string length of the node identification name must be between 2 and 128 characters.

Only lowercase letters can be used at the beginning and end of the node identification name string.

The identification name of a node is unique throughout the tree structure.

When converting a node in the OPC UA server address space to a node in the new data model, in order to satisfy the above constraints, the meta information conversion unit 23*a* sometimes changes the identification name of the node and the connection between nodes based on the rules defined in advance. The following changes are made in the example shown in FIG. 7B.

The "Root" node is converted to a set of "controller" node and "controller_sensor" node.

Uppercase letters in node identification names are converted to lowercase letters.

Unusable character strings other than lowercase letters in node identification names are removed.

If the identification name of the node is one character or less after the above conversion is performed, the blanks are filled with random lowercase letters.

If the node identification name is 129 characters or more, the part that exceeds 128 characters is truncated.

If the node identification name does not satisfy the constraints of the new data model even after the above conversion is performed, prompt the configurator to set the node identification name.

Further, in FIG. 7B, the data collection target "Run" and "Stop" nodes are converted to attributes of the "test" node in the new data model. An attribute belongs to one of the nodes of the new data model, and is the storage destination for the data acquired from the data collection target. When the operator clicks a node such as "test" in the new data model, a list of attributes of that node is displayed. FIG. 7B also shows the data type (integer) of these attributes. As for the data type of the attribute, an appropriate data type is selected based on a predetermined rule based on the data type of the node of the OPC UA server, but it can also be specified by the operator. Although not shown in the drawing, other information included in the first meta information, such as data range, unit information, etc., is assumed to be reflected in attributes of the new data model.

When the second meta information including the new data model 27 is created, the first meta information and the second meta information are stored in memory unit 17. Once the first meta information and the second meta information are stored, the preparation for receiving the first machine information is complete. Thus, the process proceeds to step S17 in FIG. 5 to acquire the first machine information of the machine 11 via the first communication unit 15. The first machine information acquired here is the first machine information of the data collection target node for which conversion from the first meta information to the second meta information was performed in step S16. The first machine information is preferably obtained periodically and stored in the memory unit 17 in time series. The reason for acquiring the information periodically is that storing the past information enables the operator to refer to the past information as necessary.

In step S18, the obtained first machine information or the stored first machine information is converted into second machine information by the machine information conversion unit 23*a*. When converting the first machine information to the second machine information, the conversion is performed based on the new data model 27 included in the second meta information. Specifically, each of the first machine information is stored in the corresponding node of the new data model 27 as the second machine information and stored in the memory unit 17. When storing in the second machine information, there are cases where the numerical value of the first machine information is converted based on the first meta information and the second meta information. For example, if the unit information of the first machine information included in the first meta information is "inch" and the unit information of the second machine information included in the second meta information is "mm", the numerical value converted to the millimeter unit system is stored as the second machine information by multiplying the numerical value of the first machine information by "25.4." Numeric conversion is not limited to simple linear conversion, but it is also possible to perform complex conversion using four arithmetic operations, logic operations, conditional judgment, and the like. As for the conversion method, there are cases where the system automatically determines from the first meta information and the second meta information, cases where it is set by the configurator, cases where both of them are combined, etc.

An example of an aspect in which the CPU of the management computer 25 converts first machine information specific to the machine 11 into second machine information specific to the operation software application 14 by the base software application 13, and outputs the second machine information to the operation software application 14 will be described. FIG. 3 is a drawing schematically showing this aspect.

As shown in FIG. 3, the machines 11 and 12 such as a machine tool and an industrial robot, a peripheral device 26, and the like are communicably connected to the management computer 25. First machine information is outputted from each of the machines 11 and 12 and the peripheral device 26 to the management computer 25. The management computer 25 can recognize which machine the first machine information belongs to from machine-specific identification information associated with the first machine information. However, the first machine information transmitted from one machine 11 to the management computer 25 is not limited to just one kind of information.

For example, when the machine 11 is a multipath controllable multiaxial NC machine tool, and a NC (numerical controller) of the machine 11 controls a first axis of the machine 11 using a first motor and a second motor according to a second system program, current values of the first motor and the second motor are each transmitted to the management computer 25, as first machine information. Furthermore, if the NC executes a first system program simultaneously with the second system program, a current value of a motor of each axis controlled by the first system program is also transmitted to the management computer 25, as first machine information. Since the first machine information just indicates which motor the current value corresponds to, it is not easy to know that the current value of the motor corresponds to which axis controlled by which system program executed by the NC of the machine 11. In other words, the first machine information is machine-specific information, and is not structured data (so-called definite format data). Such first machine information is difficult to deal with in data analysis, when the operation software application 14 is, for example, a machine information analysis software application, a machine information tabulation display software application, or the like. In order to allow the operation software application to deal with the machine-specific information in real time, the machine-specific first machine information is required to be converted into second machine information specific to the operation software application 14.

FIG. 4 is a drawing of an example of a newly created data model for the machine 11, i.e., a NC machine tool, and this data model is included in the second meta information. When the machine 11 is a multiaxial NC machine tool, as described above, the data model 27 has a graph-type data structure, as shown in FIG. 4, in which at least physical elements constituting NC machine tools or various management elements to be managed by the NC machine tools are indicated by nodes. In the data model of FIG. 4, information (hereinafter referred to as identification information) to identify each node corresponding to each individual physical element and various management elements is a text designation, but may be an identification number (for example, a number assigned to each system, axis, motor, or the like in FIG. 4) corresponding to the text designation. Alternatively, the identification information may be set based on information acquired from the NC machines. In this application, "physical elements" refer to equipment operated by physical energy (electricity, heat, power, and the like), out of components of machines.

As examples of individual physical elements constituting NC machine tools, there are, for example, a display unit, a NC, a power supply, an amplifier, a PLC, a spindle, a feed shaft, a motor, and the like. On the other hand, as various management elements of machines, there are information directly related to physical elements such as current value, position, and torque, and machine management elements such as production status, operating status, quality information, and operation history that are not directly related to physical elements. The structure of the data model 27 is an example, and may be a network-type or mesh-type data structure in addition to a graph type (including a tree type). In other words, the data model expresses the subordination of the plurality of devices that make up the machine 11.

The data model 27 may have another structure, as long as the data model 27 is constituted of nodes corresponding to at least physical elements or management elements. In other words, the data model 27 is not necessarily constituted of only nodes corresponding to physical elements and management elements, as shown in FIG. 4, but, for example, may be constituted of only nodes corresponding to the physical elements or only nodes corresponding to the management elements. The data model 27 may appropriately include a node corresponding to a different element from the physical elements or the management elements, a blank node corresponding to no element, or the like.

When the management computer 25 receives a current value of a first motor of a first axis of a second system from the machine 11, i.e., a NC machine tool, the CPU of the management computer 25 converts the received "current value of first motor", i.e., first machine information, into "machine 11/NC/second system/first axis/first motor/current value", i.e., second machine information including information about a machine structure element being a source of the current value, by the base software application 13 with reference to the data model 27 shown in FIG. 4. The information conversion operation will be described later in detail, by taking a robot as an example.

The conversion process facilitates identifying the information about the current value outputted from the machine 11 as the current value of the first motor of the first axis controlled by the second system program executed by the NC of the machine 11. In other words, in order to allow the operation software application 14 to easily deal with first machine information from the machines 11 and 12, the first machine information can be converted into definite format information (so-called structured data) containing the first machine information and information about all elements from which the first machine information derives.

The current value of the motor is described above as a part of the first machine information and the second machine information, but the present invention is not limited thereto. A part of the first machine information and the second machine information may include information about, for example, an operating time, a vibration value, a generated temperature, a sound volume, position information, and the like of each of the machines 11 and 12.

As described above, when the management computer 25 converts the first machine information into the second machine information by the machine information conversion unit 23*a* of the base software application 13, the conversion is performed based on the new data model 27 stored in the memory of the management computer 25.

Referring to FIG. 7A again, in step S19, the operation software application 14 acquires the second machine information and the second meta information via the second communication unit 16. The second machine information is stored in each node of the new data model 27 of the second meta information. Thus, the operation software application 14 can interpret and use the meaning of the second machine information.

Thus, in the present disclosure, the meta information conversion unit 23*b* can automatically create the second meta information including the new data model 27 based on the first meta information as the data structure of the communication standard. Thus, neither the operation of selecting an appropriate data model from a plurality of data models nor the operation of creating a new data model by the operator is required. In other words, the setting for holding data is simplified, and it becomes possible to easily centrally manage the data of devices conforming to various communication standards. Since the communication standard can be unified while maintaining the data structure unique to the machine 11, the need for the base software application 13 and/or the operation software application 14 to support various communication standards can be eliminated.

Although the conversion of the machine information is described above, the conversion of the command information can be performed in the same manner. When first command information is converted into second command information by the information conversion unit 23 of the base software application 13, the management computer 25 performs the conversion based on the second meta information including the newly created data model 27 stored in the memory of the management computer 25.

Figure 10:
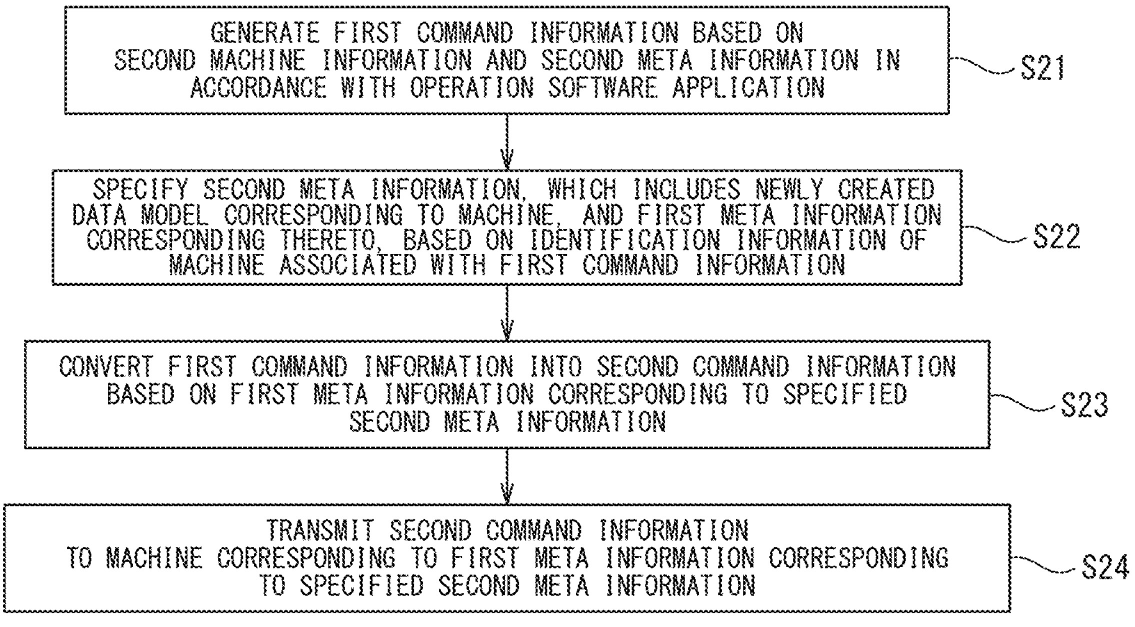
FIG. 10 is a flowchart illustrating an operation flow including a command information conversion procedure of the management computer according to the configuration example shown in FIG. 8 or FIG. 9.

FIG. 8 is a block diagram of a configuration example in which the CPU 30 of the management computer 25 performs a command information conversion process. FIG. 9 is a block diagram of another configuration example different from FIG. 8. FIG. 10 is a flowchart of the operation of the management computer 25 shown in FIG. 8 or 9, including a command information conversion step.

As shown in FIG. 10, the CPU 30 of the management computer 25 in FIG. 8 or FIG. 9 generates first command information based on second machine information and second meta information by the operation software application 14 (step S21). At this time, machine-specific identification information included in the second meta information is preferably associated with the generated first command information. Furthermore, the CPU 30 of the management computer 25 identifies the second meta information including the newly created data model corresponding to the machine and the first meta information corresponding thereto from within the memory of the management computer 25 (memory unit 17 in FIGS. 8 and 9) based on the machine identification information associated with the created first command information (step S22). The management computer 25 converts the first command information into the second command information based on the first meta information corresponding to the identified second meta information (step S23), and transmits the second command information to the machine corresponding to the first meta information corresponding to the identified second meta information (step S24). The above operations are realized by causing the CPU of the management computer 25 to execute the information conversion unit 23 of the base software application 13.

In the above example of the multiaxial NC machine tool, the first command information that indicates what operation is commanded to which device included in which machine, e.g. "machine 11/NC/second system/first axis/first motor/current command value", can be converted into the second command information, e.g. "current command value", based on the data model 27. The current command value can be outputted to an amplifier to supply power to the first motor for driving the first axis of the second system of the NC in the machine 11.

In each configuration example of FIGS. 5 and 8, the management computer 25 can replace the connected machine 11 with a machine 12 (robot) of a different category from the machine 11, or with a machine (machine tool) of the same category as the machine 11. As in the case of the configuration examples of FIGS. 6 and 9, a plurality of machines, for example, two machines 11 (machine tools) and one machine 12 (a robot) may be connected to the management computer 25. As described above, one or more machines can be connected to the management computer 25. The management computer 25 can replace a connected machine with another machine of the same category as the machine, or with another machine of a different category from the machine. In addition to a connected machine, the management computer 25 can be connected to another machine of the same category as the machine, or another machine of a different category from the machine.

As shown in FIG. 11, the data model 28 for the machine 12, i.e., a robot, has a graph-type data structure in which, at least, individual physical elements constituting robots or various management elements to be managed by the robots are indicated by nodes. The data model 28 is also included in the second meta information.

The structure of the data model 28 is just an example, and the data model 28 may have a network-type or mesh-type data structure, instead of the graph-type (including tree-type) data structure. In the data model of FIG. 11, identification information to identify each of the nodes corresponding to the individual physical elements and the various management elements is a text designation, but may be an identification number (for example, a number assigned to each of groups, axes, motors, and the like of the robot in FIG. 11) corresponding to the text designation.

"Groups" represented in the data model for robots shown in FIG. 11 refer to the classification of various operations of the robots. As the types of the operations of the robots, there are operations of each axis of robot bodies, operations of each axis of tools attached to the robot bodies, operations of each axis of carriages on which the robot bodies are installed in a movable manner, and the like, and such various operations are grouped.

Furthermore, in the data model (data model 28) for robots as shown in FIG. 11 and the data model (data model 27) for NC machine tools as shown in FIG. 4, information (first machine information in this embodiment) about each individual physical element or various management elements corresponding to a node can be assigned to the node.

For example, in the data model 28 of FIG. 11, various types of information about a present position, a current value, a torque, and the like can be assigned to a distal node 31 corresponding to a first motor of an axis 1 in a group 1 (refer to blanks (blank portions) indicated by reference numeral 32 of FIG. 13). As a matter of course, various types of information can be assigned to other nodes (internal nodes or leaf nodes).

The data model 28 may also have another structure, as long as the data model 28 is constituted of nodes corresponding to at least physical elements or management elements. In other words, the data model 28 is not necessarily constituted of only the nodes corresponding to the physical elements and the management elements, as shown in FIG. 11, but, for example, may be constituted of only nodes corresponding to the physical elements or only nodes corresponding to the management elements. The data model 28 may appropriately include a node corresponding to a different element from the physical elements or the management elements, a blank node corresponding to no element, or the like.

Figure 12:
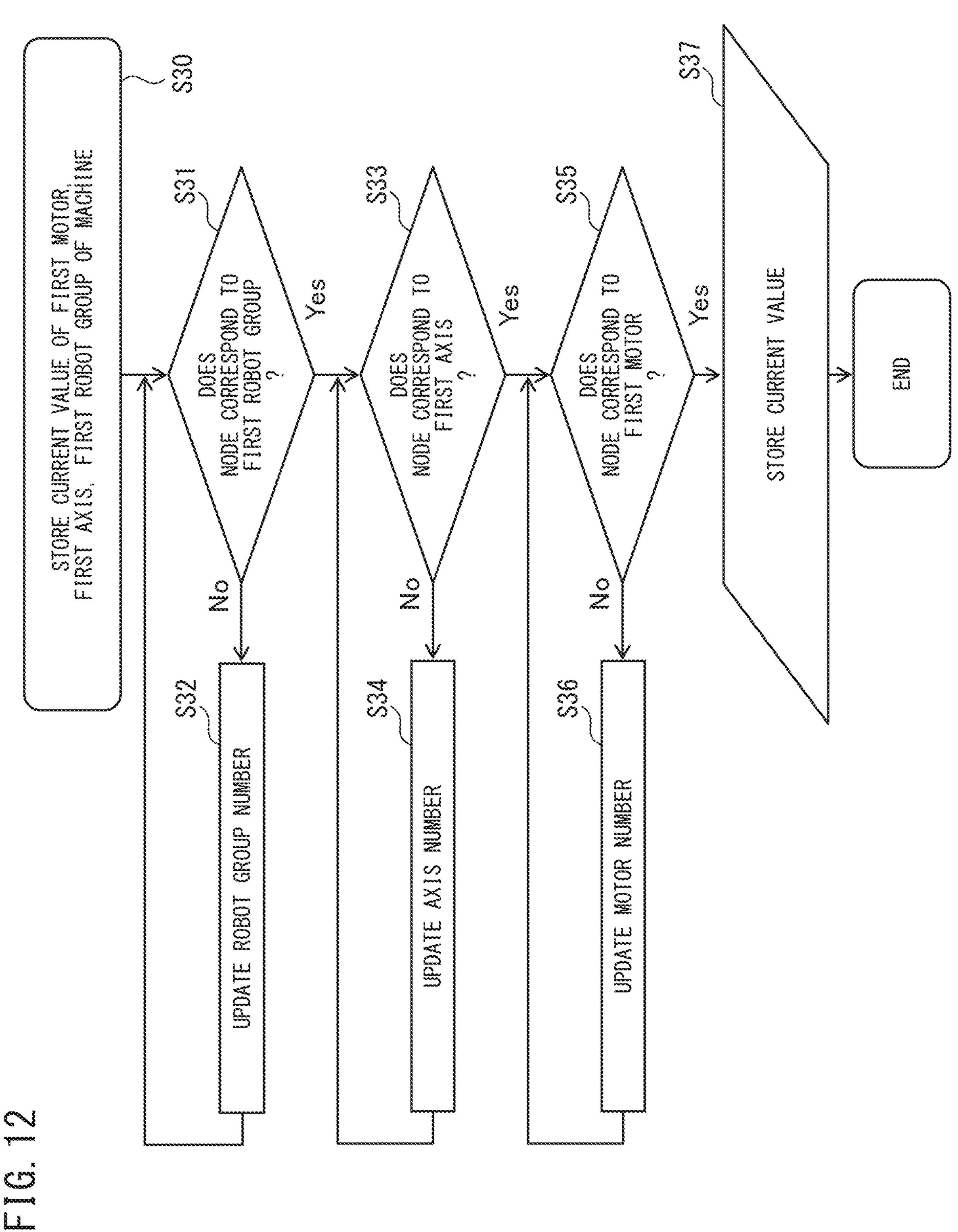
FIG. 12 is a flowchart detailing an example of an operation when generating second machine information based on the data model of FIG. 11.

FIG. 12 is a flowchart that explains an example of an operation for generating second machine information based on the data model of FIG. 11.

Before the operation flow of FIG. 12 is started, it is assumed that the management computer 25 as shown in FIG. 5 or 6 has received a current value of a first motor of an axis 1 in a group 1 of the machine 12 (robot), as first machine information. Thus, the information conversion unit 23 of the base software application 13 commands the CPU 30 to store the current value of the first motor of the axis 1 in the group 1, based on the data model 28 (FIG. 11) (step S30).

Then, in step S31, the CPU 30 searches the data model 28 stored in the memory unit 17 (see FIG. 11) for a node corresponding to the group 1 (first robot group). In other words, the CPU 30 sequentially determines whether or not each node constituting the data model 28 is a node corresponding to the group 1 (first robot group). The determination is repeated until the node corresponding to the group 1 is found (steps S31 to S32).

When the node of the group 1 is identified in step S31, in the next step S33, the CPU 30 searches the data model 28 (see FIG. 11) for a node corresponding to the axis 1 of the group 1. The CPU 30 sequentially determines whether or not each of nodes corresponding to the group 1 is a node corresponding to the axis 1 (first axis). The determination is repeated until the node corresponding to the axis 1 is found (steps S33 to S34).

When the node of the axis 1 of the group 1 is identified in step S33, in the next step S35, the CPU 30 searches the data model 28 (see FIG. 11) for a node corresponding to the first motor of the axis 1 of the group 1. The CPU 30 sequentially determines whether or not each of nodes corresponding to the axis 1 of the group 1 is a node corresponding to the first motor. The determination is repeated until the node corresponding to the first motor is found (steps S35 to S36).

According to steps S31 to S36, the CPU 30 can identify the node corresponding to the first motor of the axis 1 of the group 1 in the data model 28 (see FIG. 11). Subsequently, the CPU 30 stores data of the current value in a blank (indicated by reference numeral 32 of FIG. 13) belonging to the identified node (step S37).

Figures 13A, 13B:
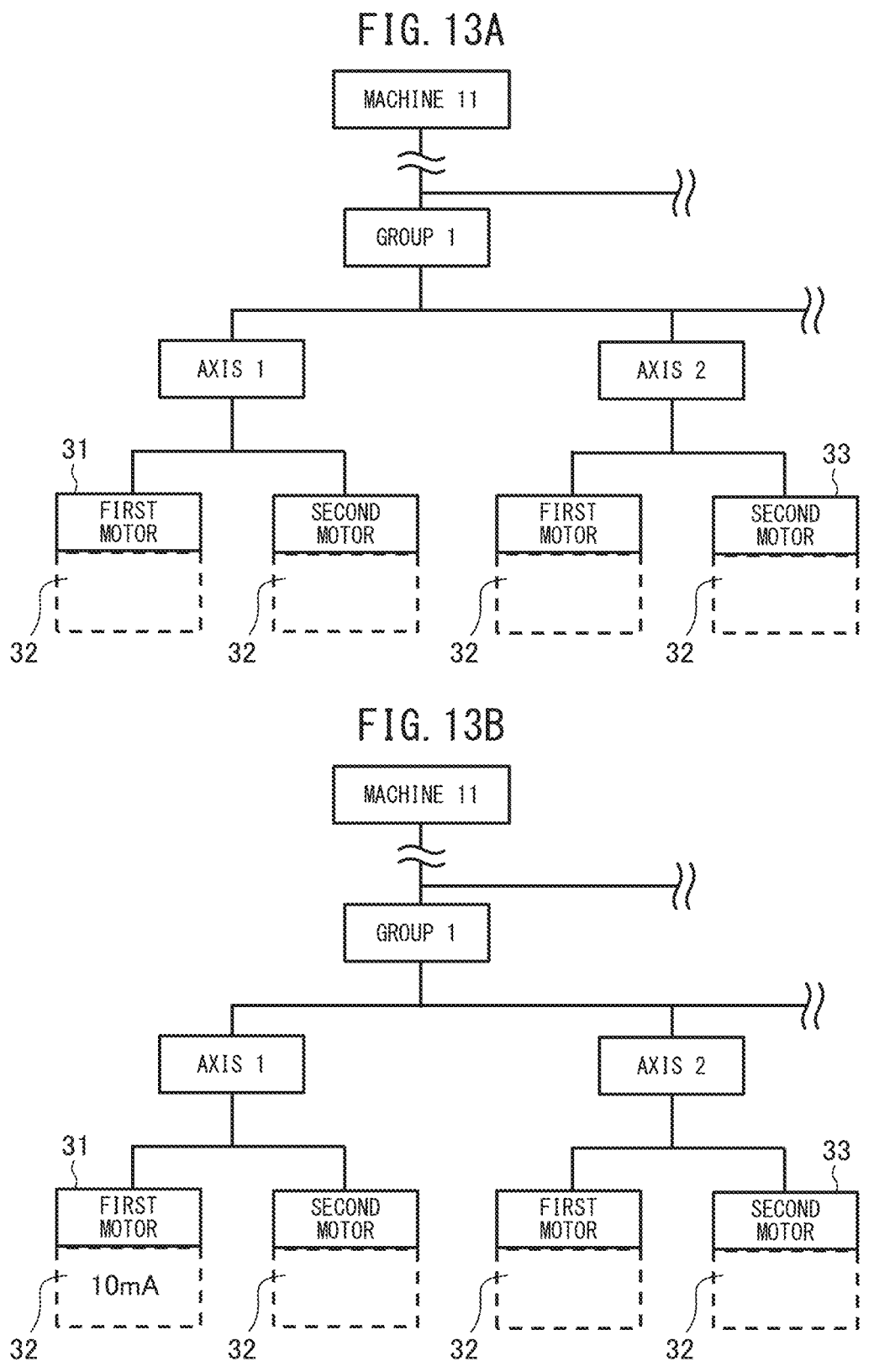

FIGS. 13A and 13B are drawings that schematically show the state of the above operation. FIGS. 13A and 13B are drawings excerpted in part from the data model for robots shown in FIG. 11. FIGS. 13A and 13B schematically show the states before and after storing the information about the current value of the first motor of the axis 1 of the group 1 of the robot, as described above.

Before the information (first machine information) about the current value of the first motor of the axis 1 in the group 1 of the robot is inputted to the management computer 25, as shown in FIG. 13A, no data is stored in a blank 32 belonging to a node 31 corresponding to the first motor of the axis 1. No data is stored in any blank 32 of any node.

When the information about the current value is inputted to the management computer 25, the information about the current value (e.g. 10 mA) is stored in the blank 32 by steps S31 to S36 (see FIG. 13B).

Since the above is just an example, if information about a current value of a second motor of an axis 2 in the group 1 of the robot is inputted to the management computer 25, the information about the current value is stored in a blank 32 belonging to a node 33 corresponding to the second motor of the axis 2 in the group 1.

As described above, the data structure of the information (in other words, second machine information) generated based on the data model of FIG. 11 is substantially the same as the data structure of the data model of FIG. 11, when viewed from the side of the operation software application 14, except that information is stored in some blank 32 and not stored in the other blanks 32. In other words, the second machine information has a definite format data structure on which the operation software application 14 can easily perform analysis, tabulation, and the like.

In FIGS. 12, 13A, and 13B above, although nodes for storing data are identified based on the structure of the data model, it is also possible to identify a node in which data should be stored based on the second meta information that is not related to the structure of the data model, or a combination of both. For example, when there are a plurality of blanks subordinate to the first motor 31 (for example, when there are both a blank storing "phase" and a blank storing "current value"), it is also possible to configure so that current value data is stored in a blank whose data type is "double" and whose unit is "ampere".

The operation of converting first machine information into second machine information, based on the data model, will be described. As a representative example, an information conversion operation, when information about a current value of a motor outputted from the machine 12, i.e., a robot, is transmitted to the operation software application 14, will be described. FIG. 14 is a flowchart of an example of the information conversion operation according to the representative example.

Before the operation flow of FIG. 14 is started, it is assumed that information (first machine information) about a current value of a first motor of an axis 1 in a group 1 of a robot is inputted to the management computer 25 as shown in FIG. 5 or 6. At this time, as shown in FIG. 13B, the information about the current value is stored in a blank 32 belonging to a node 31 corresponding to the first motor of the axis 1 in the group 1 of the robot. The base software application 13 commands the CPU 30 to convert the information about the current value of the motor stored in the blank 32 into second machine information, and to transmit the second machine information to the operation software application 14 (step S40).

Then in step S41, the CPU 30 determines whether or not a robot group number that targets the information of the current value of the first motor of the axis 1 of the group 1 is present in the data model 28 (see FIG. 11) stored in the memory unit 17. When the robot group number is determined to be present, the CPU 30 stores the robot group number (group 1 in this example) in the memory unit 17 (step S42). When the robot group number is determined to be absent in step S41, the CPU 30 ends the process of step S40.

Then, in step S43, whether or not an axis number that targets the information of the current value of the first motor of the axis 1 of the group 1 is present in the data model 28 (see FIG. 11) stored in the memory unit 17 is determined. When the axis number is determined to be present, the CPU 30 stores the axis number (axis 1 in this example) in the memory unit 17 (step S44). When the axis number is determined to be absent in step S43, the CPU 30 updates the robot group number (step S45), and performs the determination of step S41 again.

Then, in step S46, whether or not a motor number that targets the information of the current value of the first motor of the axis 1 of the group 1 is present in the data model 28 (see FIG. 11) stored in the memory unit 17 is determined. When the motor number is determined to be present, the CPU 30 stores the motor number (1 in this example) in the memory unit 17 (step S47). When the motor number is determined to be absent in step S46, the CPU 30 updates the axis number (step S48), and performs the determination of step S41 again.

In the next step S49, the CPU 30 compiles the robot group number obtained in step S42, the axis number obtained in step S44, the motor number obtained in step S47, and the current value into a series of information, and transmits the information to the operation software application 14. For example, the CPU 30 transmits a data series of "robot group 1/axis 1/first motor/current value" to the operation software application 14.

Then, in step S50, the CPU 30 updates the motor number (step S50), and performs the determination of step S41 again.

According to steps S41 to S50, as described above, the CPU 30 can convert the first machine information, e.g. the first current value of the first motor of the axis 1 in the group 1 of the robot, into the second machine information containing information about a machine structure component from which the current value derives, based on the data model 28 (data model for robots shown in FIG. 11), and transmit the second machine information to the operation software application 14. Therefore, the processing speed (for example, the speed of analysis, tabulation, and the like) of the operation software application 14 can be improved.

FIG. 15 is a drawing of another example of the data model for NC machine tools. FIG. 16 is a drawing of another example of the data model for robots. The data model shown in FIG. 15 may be used instead of the data model for NC machine tools shown in FIG. 4. The data model shown in FIG. 16 may be used instead of the data model for robots shown in FIG. 11.

For example, in the data model for NC machine tools shown in FIG. 15, nodes indicated with a controller for NC machine tools, a controller PLC, a controller sensor, a controller laser, a CNC axis, a controller CNC motor, a laser oscillator, a sensor, and the like are nodes of individual physical elements constituting the NC machine tools. The other nodes are nodes corresponding to various management elements to be managed by the NC machine tools (for example, an operation state, a production state, quality maintenance information, an operation history, and the like). In each drawing, a notation of "1:1" denotes that a parent node and a child node are present at a ratio of 1:1. A notation of "1:n" denotes that a plurality of child nodes are present with respect to one parent node. In FIG. 15, dotted lines indicate that structure components are present in the physical components corresponding to parent nodes.

In the data model according to this embodiment, as shown in the data structure shown in FIGS. 15 and 16, nodes corresponding to individual physical elements constituting machines may be arranged in one of a column direction and a row direction (column direction in the drawings), nodes corresponding to various management elements of the machines may be arranged in the other of the column direction and the row direction (row direction in the drawings). In the data models of FIGS. 15 and 16, blanks 32 are present in certain nodes, as described with reference to FIG. 13.

In the machine system 10 according to this embodiment, the machines 11 and 12 and the like are installed in, for example, a plant for manufacturing products. On the other hand, the base software application 13 is installed in the management computer 25 disposed in, for example, another building in the site of the plant having the machines 11 and 12 and the like. In this case, the management computer 25 is preferably connected to each of the machines 11 and 12 and the like so as to establish intercommunication therewith over an intranet e.g. a fieldbus network. The management computer 25 is a computer. Furthermore, the management computer 25 is preferably connected to a host computer 24 (refer to FIG. 2) disposed in e.g. an office in a remote location from the plant, so as to establish intercommunication therewith over the Internet. The host computer 24 is, for example, a manufacturing execution system (MES) that makes a production plan for the machines 11 and 12 and the like and manages a production state in the office.

The base software application 13 and the operation software application 14 are preferably installed in the management computer 25 from computer-readable portable recording mediums using well-known setup programs or the like. The portable recording medium is, for example, a CD-ROM (compact disk read only memory), a DVD-ROM (digital versatile disk read only memory), or the like. When the base software application 13 and the operation software application 14 are each recorded in the recording mediums, the management computer 25 preferably includes drives for the recording mediums. The base software application 13 and the operation software application 14 may be downloaded from another computer connected to the management computer 25 through the Internet, Ethernet (trademark), or the like.

The base software application 13 according to this embodiment can be a base i.e., a software platform for running not only a single operation software application 14 but a plurality of operation software applications 14 for performing different types of processing. In this case, each operation software application 14 preferably includes in advance identification information assigned to a machine to which information processing is to be performed, and each operation software application 14 is preferably programmed so as to obtain second machine information based on the identification information of the machine. Alternatively, it is preferably programmed to convert the first meta information obtained from the connected machine into the second meta information and obtain the second machine information based on the second meta information. Thus, even when the plurality of operation software applications 14 are installed in the management computer 25, the management computer 25 can recognize that the second machine information belongs to which machine processed by which operation software application 14, from the second meta information including the identification information of the machine associated with the second machine information.

Figure 17:
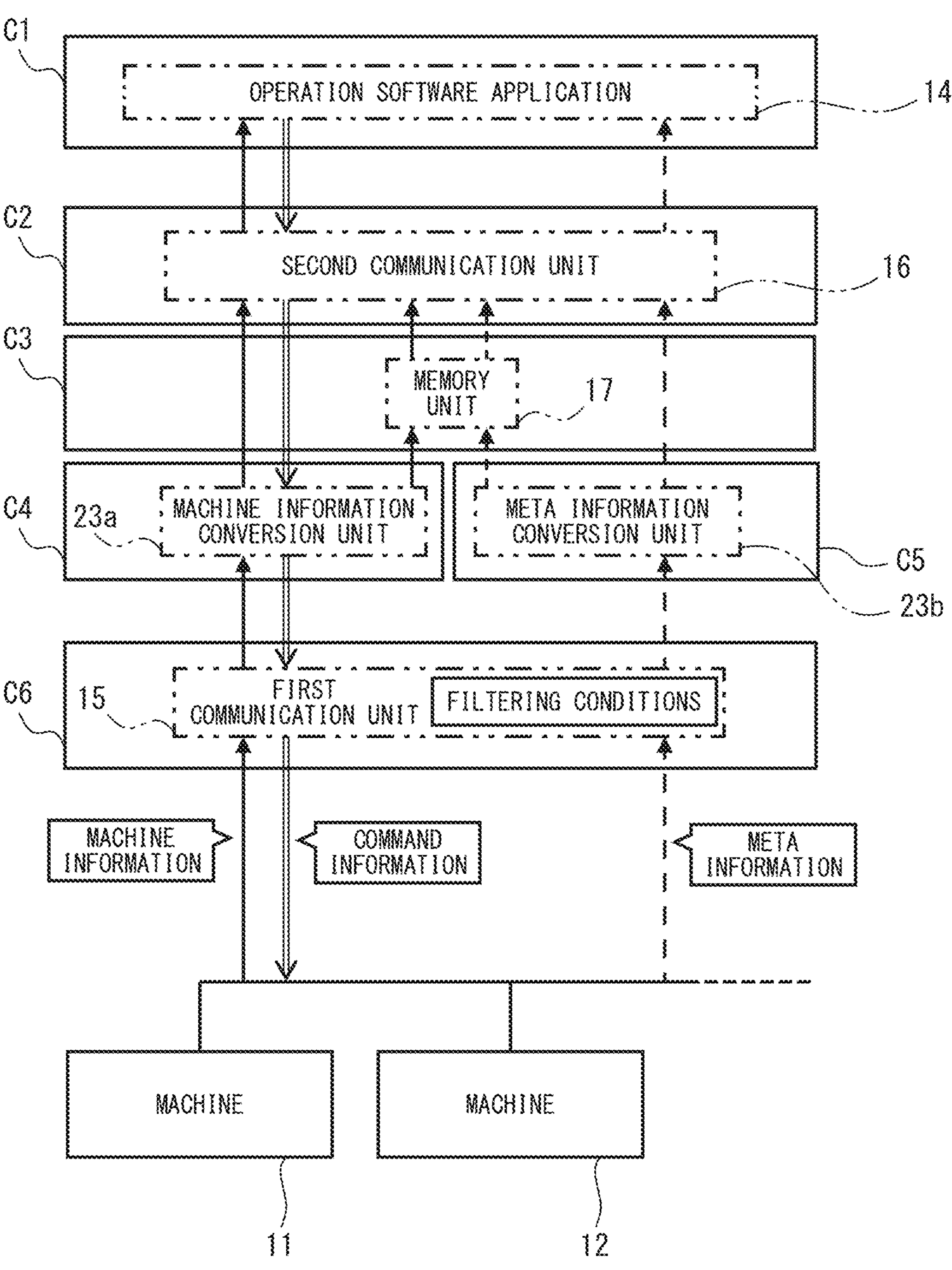
FIG. 17 is a view schematically illustrating the configuration of a machine system according to yet another embodiment.

FIG. 17 is a view schematically illustrating the configuration of a machine system in still another embodiment. In FIG. 17, the operation software application 14, the first communication unit 15, the second communication unit 16, the meta information conversion unit 23*b*, and the machine information conversion unit 23*a* are incorporated in independent computers C1 to C6, respectively. The computers C1 to C6 are connected so as to be able to communicate with each other. Alternatively, some of the operation software application 14, the first communication unit 15, the second communication unit 16, the meta information conversion unit 23*b*, and the machine information conversion unit 23*a* may be incorporated into one computer, and the remainder of the operation software application 14, the first communication unit 15, the second communication unit 16, the meta information conversion unit 23*b*, and the machine information conversion unit 23*a* may be incorporated in a single other computer or a plurality of other computers. Specifically, at least one of the operation software application 14, the first communication unit 15, the second communication unit 16, the meta information conversion unit 23*b*, and the machine information conversion unit 23*a* may be incorporated in an independent computer. In the case of FIG. 17 as well, the same effects as described above are obtained, and such a case is also included in the scope of the present disclosure.

Aspects of the Present Disclosure

According to a first aspect, there is provided a computer (25) communicably connected to at least one machine (11), comprising a base software application (13) and an operation software application (14) installed in the computer, wherein the base software application includes a first communication unit (15) being a program portion to enable an arithmetic device of the computer to receive first machine information, which is specific to the machine, output from the machine, and first meta information representing a meaning of the first machine information, a second communication unit (16) being a program portion to enable the arithmetic device of the computer to transmit second machine information, which is specific to the operation software application, and second meta information representing a meaning of the second machine information to the operation software application, a meta information conversion unit (23*b*) being a program portion to enable the arithmetic device of the computer to convert the first meta information to the second meta information, and a machine information conversion unit (23*a*) being a program portion to enable the arithmetic device of the computer to convert the first machine information to the second machine information, wherein the operation software application is a program using the second machine information as input information.

According to a second aspect, in the first aspect, the first meta information has a data structure in which at least each physical element constituting the machine or various management elements of the machine is or are indicated by a node, and the first machine information is assigned to the node corresponding to each physical element or the various management elements, and the second meta information has a data structure created based on the first meta information, and the second machine information obtained by converting the corresponding first machine information is assigned to the node constituting the data structure.

According to a third aspect, in the first or second aspect, filtering conditions for receiving only a part of the first meta information are set in advance.

According to a fourth aspect, in any of the first to third aspects, there is further provided a memory unit (17) for storing at least one of the first machine information, the first meta information, the second machine information, and the second meta information in time series.

According to a fifth aspect, in any of the first to fourth aspects, the first communication unit is a program portion to enable the arithmetic device of the computer to further transmit second command information specific to the machine in order to send a command to the machine, the second communication unit is a program portion to enable the arithmetic device of the computer to further receive first command information specific to the operation software application from the operation software application, and the machine information conversion unit is a program portion to enable the arithmetic device of the computer to further convert the first command information to the second command information based on the second meta information.

According to a sixth aspect, there is provided a system (11) communicably connected to at least one machine (11), comprising an operation software application (14), a first communication unit (15) for receiving first machine information specific to the machine output from the machine, and first meta information representing a meaning of the first machine information, a second communication unit (16) for transmitting second machine information specific to the operation software application, and second meta information representing a meaning of the second machine information to the operation software application, a meta information conversion unit (23*b*) for converting the first meta information to the second meta information, and a machine information conversion unit (23*a*) for converting the first machine information to the second machine information, wherein the operation software application is a program using the second machine information as input information, and at least one of the operation software application, the first communication unit, the second communication unit, the meta information conversion unit, and the machine information conversion unit is incorporated in an independent computer (C1 to C6).

According to a seventh aspect, in the sixth aspect, the first meta information has a data structure in which at least each physical element constituting the machine or various management elements of the machine is or are indicated by a node, and the first machine information is assigned to the node corresponding to each physical element or the various management elements, and the second meta information has a data structure created based on the first meta information, and the second machine information obtained by converting the corresponding first machine information is assigned to the node constituting the data structure.

According to an eighth aspect, in the sixth or seventh aspect, filtering conditions for receiving only a part of the first meta information are set in advance.

According to a ninth aspect, in any of the sixth through eighth aspects, there is further provided a memory unit (17) for storing at least one of the first machine information, the first meta information, the second machine information, and the second meta information in time series.

According to a tenth aspect, in any of the sixth through ninth aspects, the first communication unit further transmits second command information specific to the machine in order to send a command to the machine, the second communication unit further receives first command information specific to the operation software application from the operation software application, and the machine information conversion unit further converts the first command information to the second command information based on the second meta information.

Though the embodiments of the present invention have been described above, a person skilled in the art would understand that various modifications and changes can be made without deviating from the scope disclosed in the claims, which are described later.

The invention claimed is:

1. A computer communicably connected to at least one machine, the computer comprising a base software application and an operation software application installed in the computer, wherein the base software application includes:

a first communication unit being a program portion to enable an arithmetic device of the computer to receive first machine information, which is specific to the at least one machine, output from the at least one machine, and first meta information representing a meaning of the first machine information, wherein the first meta information has a first data structure in which at least each physical element constituting the at least one machine or various management elements of the at least one machine is or are indicated by a first node, and the first machine information is assigned to the first node corresponding to each physical element or the various management elements, a second communication unit being a program portion to enable the arithmetic device of the computer to transmit second machine information, which is specific to the operation software application, and second meta information representing a meaning of the second machine information to the operation software application, wherein the second meta information has a second data structure created based on the first meta information, a meta information conversion unit being a program portion to enable the arithmetic device of the computer to convert the first meta information to the second meta information, and a machine information conversion unit being a program portion to enable the arithmetic device of the computer to convert the first machine information to the second machine information based on the second data structure included in the second meta information, wherein the second machine information obtained by converting the first machine information is assigned to a second node constituting the second data structure, the first communication unit receives the first machine information of a data collection target node for which conversion from the first meta information to the second meta information is performed, the machine information conversion unit is configured to store the first machine information in the second node of the second data structure as the second machine information, and the operation software application is a program using the second machine information as input information.

2. The computer according to claim 1, wherein filtering conditions for receiving only a part of the first meta information are set in advance.

3. The computer according to claim 1, further comprising a memory unit for storing at least one of the first machine information, the first meta information, the second machine information, or the second meta information in time series.

4. The computer according to claim 1, wherein the first communication unit is a program portion to enable the arithmetic device of the computer to further transmit second command information specific to the at least one machine in order to send a command to the at least one machine, the second communication unit is a program portion to enable the arithmetic device of the computer to further receive first command information specific to the operation software application from the operation software application, and the machine information conversion unit is a program portion to enable the arithmetic device of the computer to further convert the first command information to the second command information based on the second meta information.

5. A system communicably connected to at least one machine, the system comprising:

an operation software application, a first communication unit for receiving first machine information specific to the at least one machine output from the at least one machine, and first meta information representing a meaning of the first machine information, wherein the first meta information has a first data structure in which at least each physical element constituting the at least one machine or various management elements of the at least one machine is or are indicated by a first node, and the first machine information is assigned to the first node corresponding to each physical element or the various management elements, a second communication unit for transmitting second machine information specific to the operation software application, and second meta information representing a meaning of the second machine information to the operation software application, wherein the second meta information has a second data structure created based on the first meta information, a meta information conversion unit for converting the first meta information to the second meta information, and a machine information conversion unit for converting the first machine information to the second machine information based on the second data structure included in the second meta information, wherein the second machine information obtained by converting the corresponding first machine information is assigned to a second node constituting the second data structure, the first communication unit receives the first machine information of a data collection target node for which conversion from the first meta information to the second meta information is performed, the machine information conversion unit is configured to store the first machine information in the second node of the second data structure as the second machine information, the operation software application is a program using the second machine information as input information, and at least one of the operation software application, the first communication unit, the second communication unit, the meta information conversion unit, or the machine information conversion unit is incorporated in an independent computer.

6. The system according to claim 5, wherein filtering conditions for receiving only a part of the first meta information are set in advance.

7. The system according to claim 5, further comprising a memory unit for storing at least one of the first machine information, the first meta information, the second machine information, or the second meta information in time series.

8. The system according to claim 5, wherein the first communication unit further transmits second command information specific to the at least one machine in order to send a command to the at least one machine, the second communication unit further receives first command information specific to the operation software application from the operation software application, and the machine information conversion unit further converts the first command information to the second command information based on the second meta information.

* * * * *